(12) United States Patent
Tanaka

(10) Patent No.: US 10,447,401 B2
(45) Date of Patent: Oct. 15, 2019

(54) OPTICAL TRANSCEIVER AND UPGRADING METHOD OF THE SAME

(71) Applicant: SUMITOMO ELECTRIC INDUSTRIES, LTD., Osaka (JP)

(72) Inventor: Yasuhiro Tanaka, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 268 days.

(21) Appl. No.: 15/380,009

(22) Filed: Dec. 15, 2016

(65) Prior Publication Data

US 2017/0170905 A1 Jun. 15, 2017

(30) Foreign Application Priority Data

Dec. 15, 2015 (JP) .................. 2015-243995

(51) Int. Cl.
| G06F 13/00 | (2006.01) |
| H04B 10/40 | (2013.01) |
| G06F 13/28 | (2006.01) |
| G06F 13/40 | (2006.01) |

(52) U.S. Cl.
CPC ............ H04B 10/40 (2013.01); G06F 13/28 (2013.01); G06F 13/4068 (2013.01)

(58) Field of Classification Search
CPC ...... G06F 13/28; G06F 13/4068; H04B 10/40
See application file for complete search history.

(56) References Cited

U.S. PATENT DOCUMENTS 8,111,999 B2* 2/2012 Ekkizogloy ............ H04B 10/40
398/135

FOREIGN PATENT DOCUMENTS

| JP | 2014-165780 | 9/2014 |
| WO | 2013/012015 | 1/2013 |

* cited by examiner

*Primary Examiner* — Idriss N Alrobaye
*Assistant Examiner* — Richard B Franklin
(74) *Attorney, Agent, or Firm* — Smith, Gambrell & Russell, LLP.

(57) ABSTRACT

An optical transceiver including a MDIO interface, a logic device, a first memory, a first bus, a second bus, and a microcontroller. The logic device includes configuration data and an internal circuit reconfigurable according to the configuration data, and is electrically connected to the second bus. The first memory is configured to store the configuration data and electrically connected to the first bus. The microcontroller is configured to receive new configuration data from the external device through the MDIO interface and write the new configuration data to the first memory through the first bus for rewriting the configuration data in the case of receiving an update command from the external device, and configured to read the new configuration data stored in the first memory through the first bus and send the new configuration data to the logic device through the second bus in the case that the optical transmitter is activated.

10 Claims, 17 Drawing Sheets

OPTICAL TRANSCEIVER AND UPGRADING METHOD OF THE SAME

TECHNICAL FIELD

The present invention relates to an optical transceiver and an upgrading method of the optical transceiver.

BACKGROUND

In recent years, high functionality and miniaturization have been demanded for an optical transceiver used in an optical communication system. For such demands, an optical transceiver including a programmable microcontroller is known. For example, Patent Literature 1 (Japanese Unexamined Patent Publication No. 2014-165780) describes an optical transceiver including a logic device of a monitoring control system that performs communication for monitoring and control by an upper layer (host device) in the OSI (Open Systems Interconnection) reference model, and a CPU (Central Processing Unit) that controls the optical transceiver.

Further, as described in Patent Literature 2 (International Publication No. 2013/012015), an optical transceiver including a digital signal processing circuit configured by a programmable FPGA (Field Programmable Gate Array) is known. The digital signal processing circuit performs digital signal processing of transmission signals (main signals) transmitted or received by an optical transceiver. In this way, an optical transceiver is sometimes made highly functional by including not only a microcontroller but also an FPGA in a path (main signal system) that transmits main signals.

SUMMARY

An optical transceiver relating to one aspect of the present invention is the optical transceiver including an Management Data Input/Output (MDIO) interface, a logic device, a first memory, a first communication bus, a second communication bus, and a controller. The MDIO interface is configured to communicate with an external device. The logic device includes configuration data and an internal circuit which is reconfigurable according to the configuration data. The first memory is configured to store the configuration data. The first communication bus is electrically connected to the first memory. The second communication bus is electrically connected to the logic device. The microcontroller is configured to receive new configuration data from the external device through the MDIO interface and write the new configuration data to the first memory through the first communication bus for rewriting the configuration data, when the microcontroller receives an update command from the external device. The microcontroller is also configured to read the new configuration data stored in the first memory through the first communication bus and send the new configuration data to the logic device through the second interface, when the optical transmitter is activated.

According to one aspect of the present invention, configuration data of a logic device can be updated while restraining increase in the number of components.

An upgrading method of an optical transceiver for communicating with an external device through an MDIO interface. the optical transceiver includes a logic device including a configuration data and an internal circuit reconfigurable based on the configuration data, a first memory for storing the configuration data, a first communication bus to which the first memory is electrically connected, and a second communication bus to which the logic device is electrically connected. In the upgrading method of the optical transceiver, the controller reads the configuration data stored in the first memory through the first communication bus, when the optical transceiver is activated, and transmits the read configuration data through the second communication bus to the logic device. Also, the controller receives new configuration data from the external device through the MDIO interface, writes the received new configuration data to the first memory through the first communication bus, and rewrites the configuration data to the new configuration data.

DETAILED DESCRIPTION

Specific examples of an optical transceiver and a microcontroller according to an embodiment of the present invention will be described hereinafter with reference to the drawings. Note that the present invention is not limited to the examples, is indicated by the scope of claims, and intends to include significances equivalent to the scope of claims and all modifications within the scope.

Figure 1:
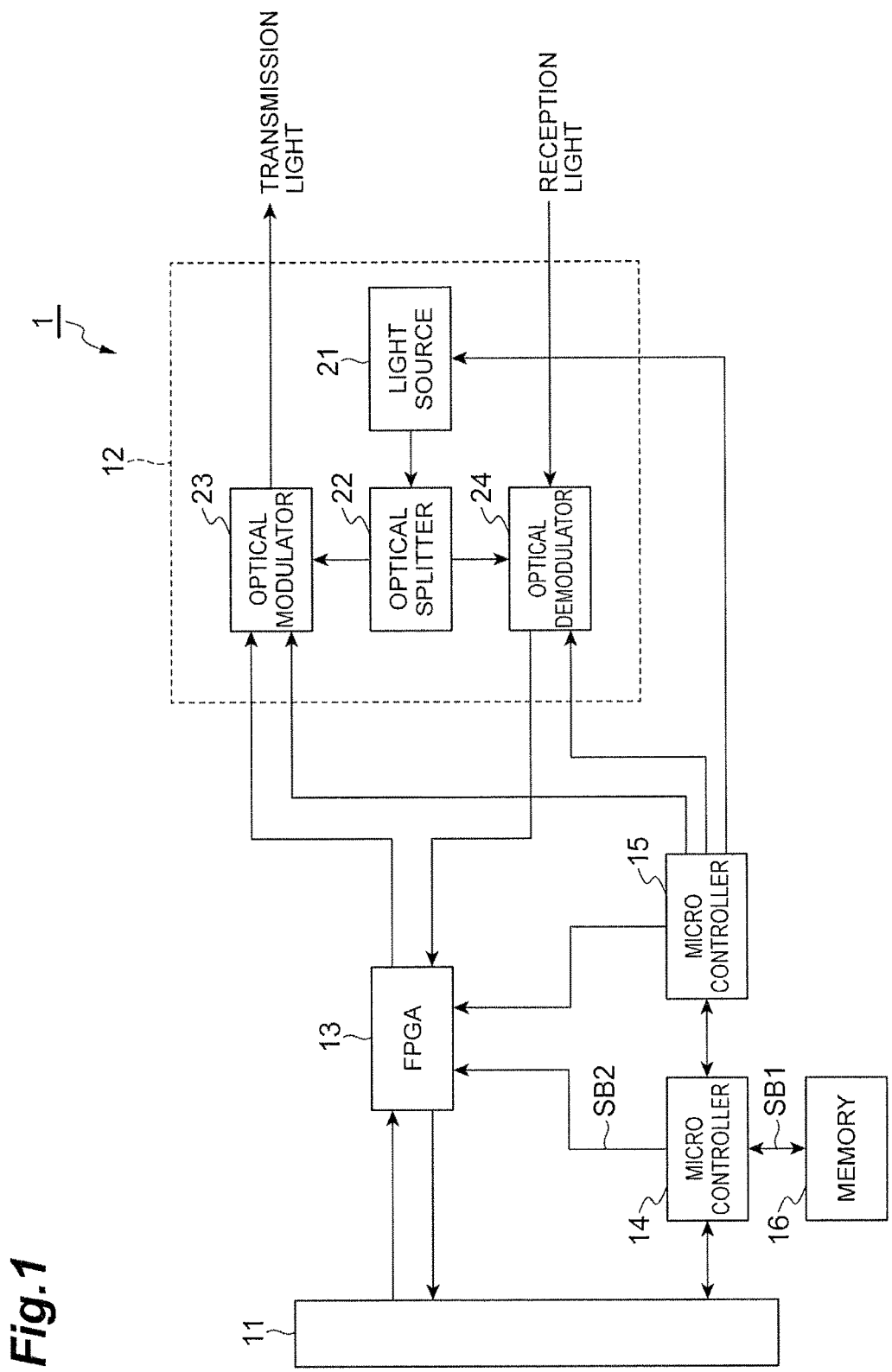
FIG. 1 is a block diagram schematically illustrating an optical transceiver according to a first embodiment of the present invention.

FIG. 1 is a block diagram schematically illustrating an optical transceiver according to an embodiment of the present invention. An optical transceiver 1 illustrated in FIG. 1 is a device capable of communicating with an external host device (external device) in an optical transmission system through an MDIO (Management Data Input/Output) interface. The optical transceiver 1 is, for example, an optical transceiver compliant with a CFP MSA (100G Form-factor Pluggable Multi-Source Agreement), which is an industry standard for one of the form factors of 100 Gbps optical transceivers. The host device is, for example, a communication device in a upper layer of the optical transceiver 1, and monitors and controls the optical transceiver 1. The optical transceiver 1 may be connected to another optical transceiver through an optical fiber not shown in FIG. 1. The optical transceiver 1 includes a connector 11, an optical unit 12, an FPGA 13 (logic device), a microcontroller 14, a microcontroller 15, and a memory 16 (first memory).

The connector 11 is a connector for electrically connecting power lines, signal lines, and so forth of the optical transmitter 1 to the host device. The connector 11 is, for example, the connector, whose shape, terminal arrangement, and functionality are specified by the CFP MSA. The optical unit 12 transmits and receives optical signals to/from another optical transceiver, through the optical fiber connected to the optical transceiver 1. The optical unit 12 includes a light source 21, an optical splitter 22, an optical modulator 23, and an optical demodulator 24.

The light source 21 is a laser diode, for example. The light source 21 generates local light having the almost same frequency as a carrier frequency of the optical signal received by the optical transceiver 1, and supplies the local light to the optical splitter 22. The optical splitter 22 is a beam splitter, for example, branches the local light supplied from the light source 21, and supplies the branched local light to the optical modulator 23 and the optical demodulator 24. Note that, differently from such a configuration, the optical unit 12 may be configured such that a transmitter optical sub-assembly (TOSA, not drawn) converts an electric signal received from the FPGA 13 to a transmission light (optical output signal) and a receiver optical sub-assembly (ROSA, not drawn) converts a reception light (optical input signal) to an electric signal, which is output to the FPGA 13.

The optical modulator 23 converts electric signals received from the FPGA 13 to the optical output signal. More specifically, the optical modulator 23 modulates the local light supplied from the optical splitter 22 in accordance with the electric signals. The optical modulator 23 transmits the optical signal to another optical transceiver through the optical fiber. The optical demodulator 24 converts the optical input signal received through the optical fiber to the electric signals. More specifically, the optical demodulator 24 makes the local light supplied from the optical splitter 22 interfere with optical input signal, and converts the optical signals generated by interference to the electric signals. The optical demodulator 24 outputs the converted electric signals to the FPGA 13. A path of the electric signals converted to transmission light from the connector 11 to the optical unit 12 and a reverse path of the electric signals converted from reception light from the optical unit 12 to the connector 11 are referred to as a main signal system here.

The FPGA 13 is a logic device, which is reconfigurable according to configuration data (circuit information). The configuration data is data specifying a circuit configuration inside the FPGA 13. The FPGA 13 is in a state that the circuit information is not written immediately after activation, in case that the FPGA 13 does not have a nonvolatile memory. Therefore, when the optical transceiver is activated, the configuration data is written to a predetermined location (volatile memory) inside the logic device (the processing is also referred to as "configuration"). The configuration data is usually stored in a nonvolatile memory externally attached to the logic device. In more detail, the FPGA 13 receives the configuration data from the microcontroller 14 when the optical transceiver 1 is activated, and performs the configuration according to the configuration data. At the time, the FPGA 13 stores the received configuration data in the predetermined location (volatile memory) in the inside. When power supply of the optical transceiver 1 is cut off, the configuration data stored in the inside is lost so that the configuration data is received every time the FPGA 13 is activated. The FPGA 13 has a function of SERDES (SERializer/DESerializer), for example. The FPGA 13 receives parallel data from the host device, converts the parallel data to serial data, and outputs the serial data to the optical modulator 23 as the electric signal. The FPGA 13 receives the electric signal of the serial data from the optical demodulator 24, converts the electric signal to parallel data, and transmits the parallel data to the host device as reception data. Note that the parallel data and the serial data here indicate relative differences in the number of signal lines and a transmission speed per signal line. In detail, in the case that the number of the signal lines of the parallel data is M (M is an integer equal to or larger than 2) and the transmission speed per signal line is P (bps), a relation that the number of the signal lines of the serial data is N (N is an integer that is 1≤N<M) and the transmission speed per signal line is Q=P×(M/N) (bps) is satisfied.

The configuration data of the FPGA 13 is sometimes updated. For example, in the case that the FPGA 13 performs digital signal processing in a digital coherent transmission system, the configuration data may be updated for a change of a signal processing algorithm for a purpose of performance improvement. In addition, for a purpose of high functionality of the optical transceiver 1, the configuration data may be sometimes updated to add functions to the FPGA 13. In that case, in order to upgrade the optical transceiver including the microcontroller and the logic device, it is needed to update the configuration data of the logic device by the microcontroller. In particular, regarding the logic device used in the main signal system, allowing new configuration data for updating to be received from the host device through a monitoring control system in the state that the optical transceiver 1 is incorporated in the host device, improves convenience of an optical transmission system relating to the upgrade of the optical transceiver 1.

In order to monitor and control the optical transceiver 1 by the host device, the microcontroller 14 performs MDIO communication with the host device. The microcontroller 14 is electrically connected to the memory 16 through a communication bus SB1 (first communication bus) and is electrically connected with the FPGA 13 through a communication bus SB2 (second communication bus). The communication bus SB1 is an SPI bus, for example. The communication bus SB2 is an exclusive bus capable of configuring the FPGA 13. The communication bus SB2 includes, for example, at least a clock signal line and a data signal line. As an interface circuit electrically connected to the communication bus SB2 of the microcontroller 14, for example, a standard SPI circuit is used. In this case, for example, among four signal lines configuring the SPI bus, which are a CS (Chip Select) signal line, an SCK (Serial Clock) signal line, an MOSI (Master Out Slave In) signal line and an MISO (Master In Slave Out) signal line, the SCK signal line and the MOSI signal line are electrically connected to the FPGA 13. When electrical specifications of a communication interface and a protocol or the like are predetermined between the FPGA 13 and the microcontroller 14, other serial communication systems may be used as the communication bus SB2.

When the optical transceiver 1 is activated, the microcontroller 14 reads the configuration data stored in the memory 16 through the communication bus SB1, and transmits the read configuration data through the communication bus SB2 to the FPGA 13. Specifically, the power supply of the optical transceiver 1 is turned on, the microcontroller 14 outputs a clock signal and the configuration data (serial communication data) to the FPGA 13 during activation processing of the optical transceiver 1, and the FPGA 13 reads the serial communication data through the data signal line in synchronism with the clock signal. Thus, the FPGA 13 is initialized.

When upgrading the optical transceiver 1, the microcontroller 14 receives upgrade data from the host device through the MDIO interface, and writes the received upgrade data to the memory 16 through the communication bus SB1. The upgrade data includes the configuration data for updating (new configuration data) and firmware for updating (new firmware). The microcontroller 14 reads the new firmware stored in the memory 16 through the communication bus SB1, and rewrites the firmware of the microcontroller 14 with the new firmware. The microcontroller 14 reads the new configuration data stored in the memory 16 through the communication bus SB1, and transmits the new configuration data through the communication bus SB2 to the FPGA 13. Thus, the FPGA 13 is reconfigured. The microcontroller 14 has a DMA function, and performs the above-described data transmission and reception by DMA transfer. In addition, the memory 16 keeps retaining the upgrade data written in the memory 16 even while the power supply of the optical transceiver 1 is cut off. Details of an operation of the memory 16 will be described later.

Note that sometimes only the configuration data of the FPGA 13 is updated. In this case, the microcontroller 14 receives the new configuration data from the host device through the MDIO interface, and writes the new configuration data to the memory 16 through the communication bus SB1. Thus, the microcontroller 14 rewrites the configuration data to the new configuration data.

The microcontroller 14 executes the firmware for performing the functionality of the optical transmitter 1. That is, the microcontroller 14 performs reading the configuration data stored in the memory 16, transmitting the read configuration data to the FPGA 13, receiving the upgrade data including the new configuration data from the host device, and writing the upgrade data to the memory 16, by executing the firmware. A detailed configuration of the microcontroller 14 will be described later.

The microcontroller 15 monitors and controls optical communication through the optical fiber. Specifically, the microcontroller 15 monitors and controls the FPGA 13 and the optical unit 12 including the light source 21, the optical modulator 23, and the optical demodulator 24. Note that, the microcontroller 14 and the microcontroller 15 are provided in order to respond to MDIO communication with the host device electrically connected with the optical transceiver 1 in parallel while monitoring and controlling the optical communication, however, the microcontroller 14 and the microcontroller 15 may be one more-integrated microcontroller.

The memory 16 is a nonvolatile storage element capable of rewriting stored data, and is, for example, a nonvolatile memory such as an EEPROM (Electrically Erasable Programmable Read-Only Memory) and a flash ROM (Read Only Memory). The memory 16 stores the configuration data of the FPGA 13 and the upgrade data of the optical transceiver 1. The microcontrollers 14 and 15 and the memory 16 configure a monitoring control unit (monitoring control system) for monitoring and controlling the main signal system configured by the FPGA 13 and the optical unit 12. Note that, though not shown in FIG. 1, an analog circuit for monitoring generation and control of an internal power supply voltage and a temperature or the like is sometimes included in the monitoring control system.

Figure 2:
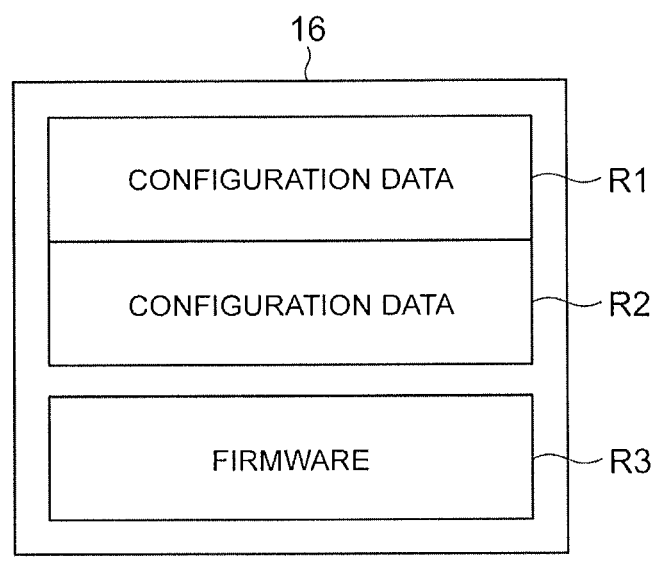
FIG. 2 is a diagram illustrating a configuration of data stored in a memory (nonvolatile memory)

FIG. 2 is a diagram illustrating a configuration of data stored in the memory 16 (first memory). As illustrated in FIG. 2, the memory 16 includes a region R1, a region R2, and a region R3. The region R1 is a region for storing the new configuration data of the FPGA 13. The region R2 is a region for storing the configuration data before updating of the FPGA 13. The region R3 is a region for storing the firmware for updating of the microcontroller 14. Note that, while only regions R1 to R3 are illustrated in order to simplify description here, the memory 16 may further include different regions.

When upgrading the optical transceiver 1, the upgrade data received from the host device by the microcontroller 14 is stored in the memory 16. Specifically, the new configuration data in the upgrade data is stored in the region R1, and the firmware for updating in the upgrade data is stored in the region R3. At the time, before the configuration data is stored in the region R1, the configuration data before updating is stored in the region R2.

Since the configuration data needs to be written to the FPGA 13 every time the optical transceiver 1 is activated, in at least one of the region R1 and the region R2, the configuration data in a complete state is stored at all times except for the time during updating. For example, in the case that the optical transceiver 1 is used in high-speed and large-volume backbone communication or the like, in preparation for the case that some problems occur in the configuration data after updating, the configuration data before updating is stored in the region R2. The new configuration data stored in the region R1 and the configuration data before updating stored in the region R2 are switched and used as needed. Thus, a possibility that the optical transceiver 1 becomes uncommunicable is reduced. The region R3 is used to temporarily store the firmware for updating when updating the firmware of the microcontroller 14, but is not used during a normal operation of the optical transceiver 1. Note that, since the configuration data has a certain size (data size), a certain amount of time is needed for the microcontroller 14 to receive all the configuration data from the host device. For example, when the power supply of the optical transceiver 1 is cut off while the microcontroller 14 is receiving the configuration data from the host device, the configuration data stored in the region R1 sometimes becomes an incomplete state of being rewritten halfway. The configuration data in the complete state described above means that all the configuration data is in the state of being normally and correctly rewritten.

Figure 3:
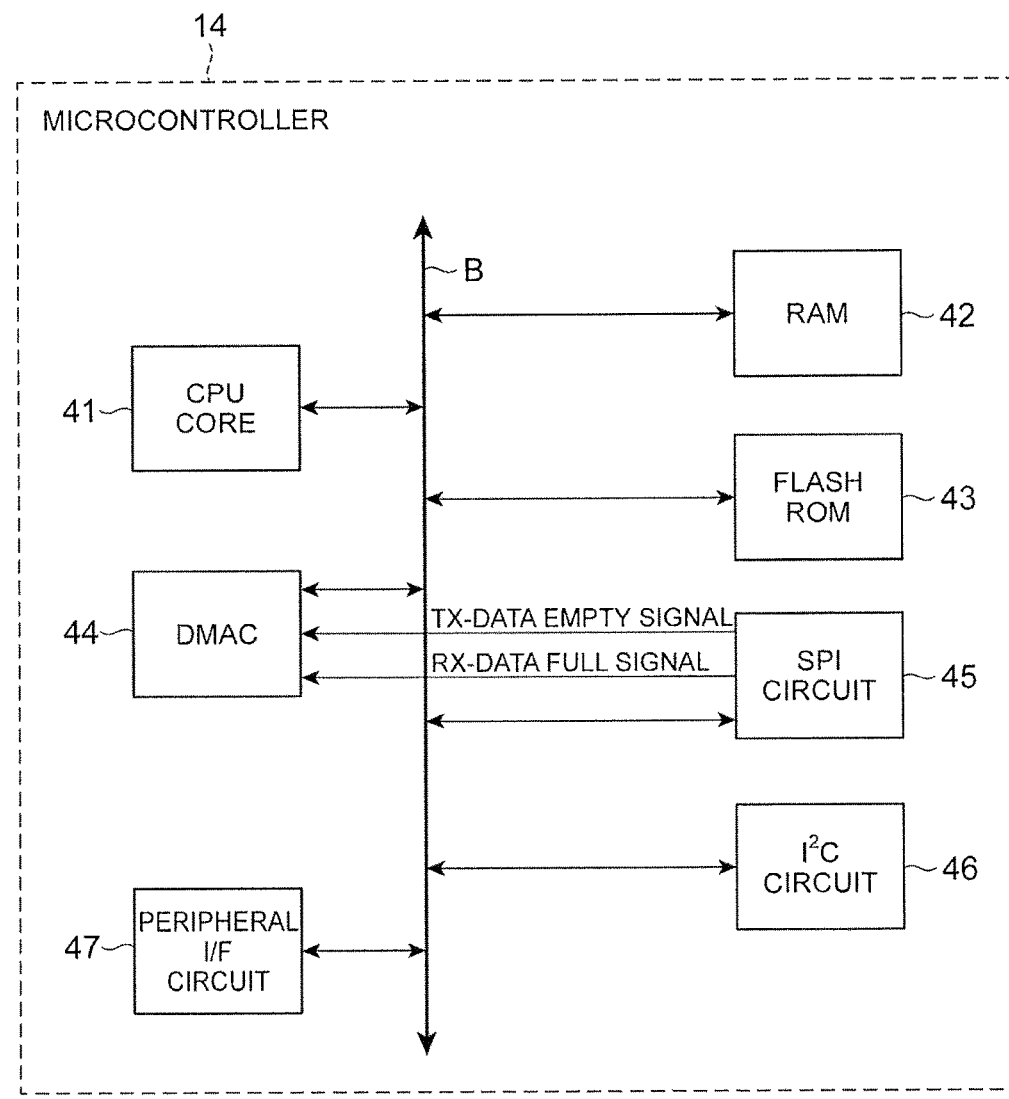
FIG. 3 is a block diagram of a microcontroller in FIG. 1.

Subsequently, the detailed configuration of the microcontroller 14 will be described. FIG. 3 is a block diagram of the microcontroller 14. As illustrated in FIG. 3, the microcontroller 14 includes a CPU core 41, a RAM (Random Access Memory) 42 (second memory), a flash ROM 43 (third memory, nonvolatile memory), a DMAC 44 (first DMA controller), an SPI circuit 45, an I²C (Inter-Integrated Circuit) circuit 46, and other peripheral interface circuit 47.

The CPU core 41 is a central processing unit that executes a program (firmware). The RAM 42 is a storage element which is capable of rewriting the stored data and temporarily stores the data during processing. The RAM 42 functions also as a DMA buffer. In the RAM 42, a storage region may be allocated respectively to a transmission DMA buffer for transmission and a reception DMA buffer for reception, or a common storage region may be allocated to the transmission DMA buffer and the reception DMA buffer if transmission processing and reception processing do not interfere with each other. The CPU core 41 prepares and stores instruction data in the transmission DMA buffer of the RAM 42. The instruction data includes a read command for the memory 16 and address information indicating a storage location where the configuration data is stored in the memory 16. The transmission DMA buffer and the reception DMA buffer may be smaller than the data size of the configuration data. The configuration data may be divided into some data blocks having block size fit to size of the DMA buffers.

The flash ROM 43 is a nonvolatile storage element capable of rewriting the stored data, and stores the firmware of the microcontroller 14.

The DMAC 44 is a controller which directly performs the transmission and reception (DMA transfer) of the data between the RAM 42 and the SPI circuit 45. When the optical transceiver 1 is activated, the DMAC 44 reads the configuration data stored in the memory 16 through the communication bus SB1, and writes the read configuration data to the RAM 42. Specifically, the DMAC 44 separately performs transmission processing and reception processing through the communication bus SB1. The transmission processing includes reading the instruction data stored in the RAM 42 and transmitting the read instruction data to the memory 16. The reception processing includes reading a data block divided from the configuration data stored in the memory 16 and writing the data block to the RAM 42.

In the case that a common region is allocated to the transmission DMA buffer and the reception DMA buffer in the RAM 42, the DMAC 44 may store the data block in an area of the RAM 42 where the transmission data already transmitted to the memory 16 is stored. Note that "to store the data at the address" means to store the data in the storage location indicated by the address. In the following description, "the storage location indicated by the address" is sometimes referred to simply as "the address". The DMAC 44 performs the DMA transfer based on a DMA descriptor. The DMA descriptor is set by the CPU core 41.

Figure 4:
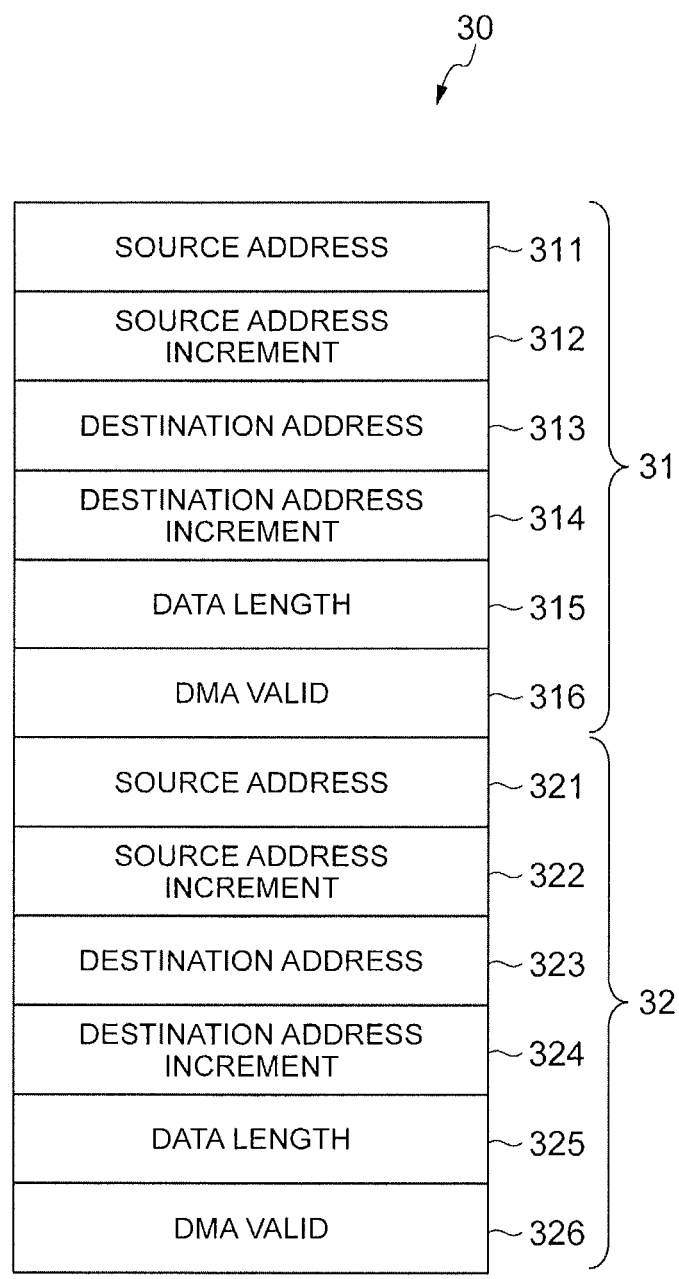
FIG. 4 is a diagram illustrating an example of a DMA (Direct Memory Access) descriptor.

FIG. 4 is a diagram illustrating one example of the DMA descriptor. As illustrated in FIG. 4, a DMA descriptor 30 includes a setting item 31 on a transmission side and a setting item 32 on a reception side. The setting item 31 includes a source address 311, source address increment 312, a destination address 313, destination address increment 314, a data length 315, and DMA valid 316.

The source address 311 is an address indicating the storage location where the DMAC 44 reads the data. The source address increment 312 is information indicating whether or not to increment the source address for each DMA transfer. The destination address 313 is an address indicating the storage location where the DMAC 44 writes the read data. The destination address increment 314 is information indicating whether or not to increment the destination address for each DMA transfer. The data length 315 is a total data length of the DMA transfer and also refers to the number of times of repeating the DMA transfer. The DMA valid 316 is information indicating whether or not to perform the DMA transfer in the setting item 31. The setting item 32 similarly includes a source address 321, source address increment 322, a destination address 323, destination address increment 324, a data length 325, and DMA valid 326.

Figure 5:
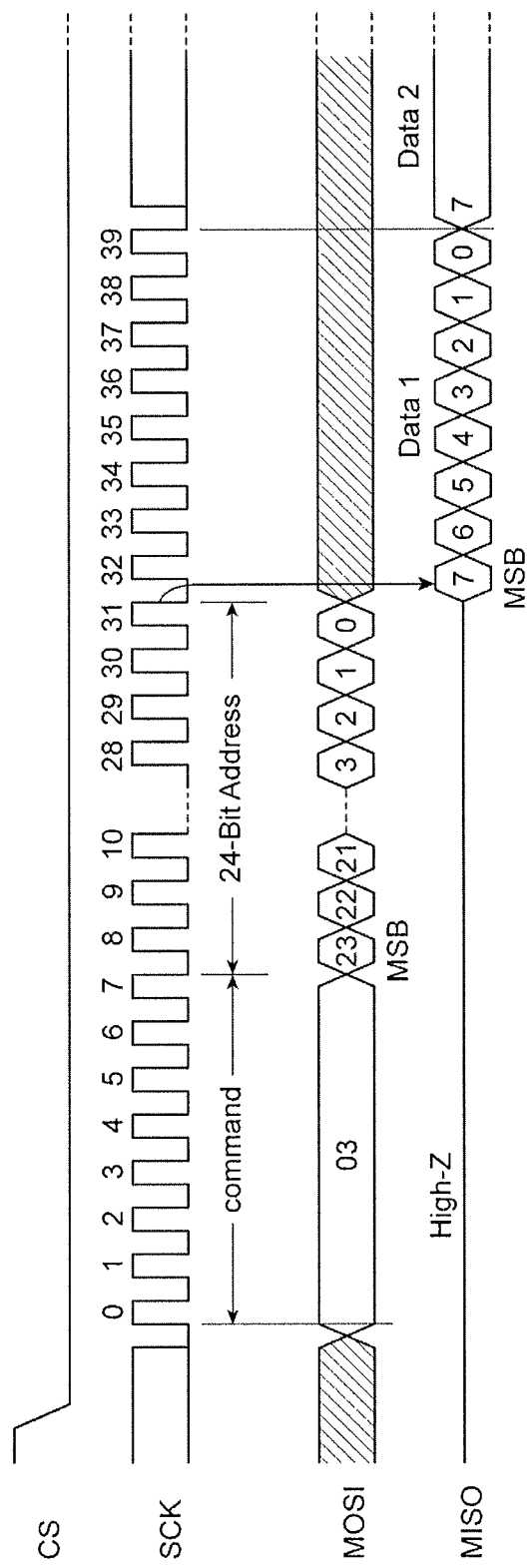
FIG. 5 is a timing chart for an operation of the microcontroller in FIG. 1 that reads data from the memory.

The SPI circuit 45 is a circuit which is electrically connected to the memory 16 through the communication bus SB1, and transmits and receives the data to/from the memory 16 by SPI communication. As illustrated in FIG. 5, the SPI circuit 45 asserts a CS signal (sets a signal level of the CS signal at a low level in order to notify the memory 16 of start of the SPI communication), and then transmits a command of 1 byte (8 bits) and an address of 3 bytes (24 bits) to the memory 16 in order as a MOSI signal, in synchronism with clock pulses of a SCK signal. Then, continuous outputting the SCK signal enables the SPI circuit 45 to read the data from a specified address of the memory 16, in synchronism with the clock pulses of the SCK signal. The SPI circuit 45 stops the SCK signal when the data of the desired number of bytes is read, and de-asserts the CS signal (sets the signal level of the CS signal at a high level in order to end the SPI communication).

For example, in the case of reading the data of 10 bytes from the memory 16, the SPI circuit 45 transmits the command of 1 byte and the address of 3 bytes, and subsequently receives the data of 10 bytes. In the SPI bus, the data are simultaneously transmitted and received so that the data of 14 bytes is transmitted and received as a whole. At the time, the fifth and succeeding bytes of the transmission data can be arbitrary values since they may be neglected in the memory 16. Similarly, the reception data to the fourth byte is dummy reception data since it may be discarded in the SPI circuit 45.

The I²C circuit 46 is a circuit which transmits and receives the data to/from another IC (Integrated Circuit) or the like by I²C communication. The peripheral interface circuit 47 is a circuit which transmits and receives the data to/from another IC or the like by predetermined communication. Note that, in the present embodiment, the peripheral interface circuit 47 is electrically connected to the FPGA 13 through the communication bus SB2. The peripheral interface circuit 47 transmits the configuration data written to the RAM 42 by the DMAC 44 to the FPGA 13 through the communication bus SB2. The peripheral interface circuit 47 may be an SPI circuit.

The CPU core 41, the RAM 42, the flash ROM 43, the DMAC 44, the SPI circuit 45, and I²C circuit 46, and the other peripheral interface circuit 47 are electrically connected to an internal bus B, and can communicate with each other through the internal bus B. More specifically, an address region assigned to each unit, which is specifiable on the internal bus B, is allocated to each unit (component) electrically connected to the internal bus B, and by specifying an address, specific data can be read or written with the unit to which the address region including the address is allocated.

Figure 6:
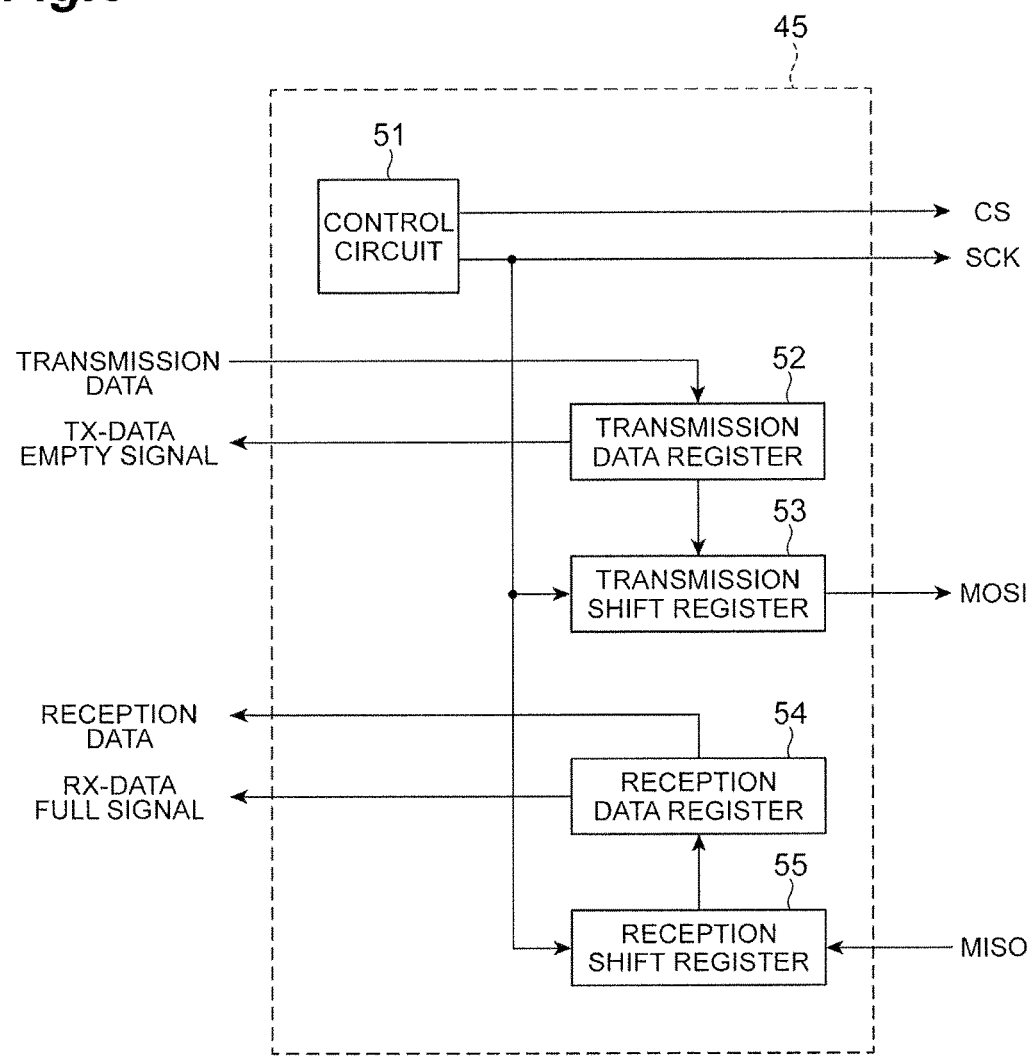
FIG. 6 is a block diagram of an SPI (Serial Peripheral Interface) circuit in FIG. 3.

Subsequently, the detailed configuration of the SPI circuit 45 will be described. FIG. 6 is a hardware block diagram of the SPI circuit 45. As illustrated in FIG. 6, the SPI circuit 45 includes a control circuit 51, a transmission data register 52, a transmission shift register 53, a reception data register 54, and a reception shift register 55.

The control circuit 51 is a circuit which controls the SPI communication, and outputs the CS signal and the SCK signal. The control circuit 51 outputs the CS signal and the CSK signal to the communication bus SB1, and outputs the SCK signal to the transmission shift register 53 and the reception shift register 55.

The transmission data register 52 is a register which stores the transmission data. The transmission data register 52 is electrically connected to the internal bus B. The transmission data can be written to the transmission data register 52 through the internal bus B. To the transmission data register 52, a preset address on the internal bus B is allocated. The CPU core 41 and the DMAC 44 write the data to the transmission data register 52 by specifying the address allocated to the transmission data register 52 on the internal bus B.

The transmission data register 52 outputs a TX-data empty signal to the DMAC 44. The transmission data register 52 outputs valid transmission data stored in the transmission data register 52 to the transmission shift register 53, and then sets (asserts) the TX-data empty signal to a state indicating that the transmission data is absent. Thus, it is notified to the DMAC 44 that it is possible to write the transmission data to the transmission data register 52. When the transmission data is written, the transmission data register 52 sets (de-asserts) the TX-data empty signal to a state indicating that the transmission data is present. The transmission shift register 53 outputs the stored transmission data bit by bit to the communication bus SB1 as the MOSI signal, based on the SCK signal.

The reception shift register 55 receives a MISO signal bit by bit through the communication bus SB1 as the reception data in synchronism with the SCK signal, and stores the reception data. When the reception data of the predetermined number of bits is received, the reception shift register 55 outputs the stored reception data to the reception data register 54. The reception data register 54 is a register which stores the reception data. The reception data register 54 is electrically connected to the internal bus B. The reception data can be read from the reception data register 54 through the internal bus B. To the reception data register 54, a preset address on the internal bus B is allocated. The CPU core 41 and the DMAC 44 read the data from the reception data register 54 by specifying the address allocated to the reception data register 54 on the internal bus B.

The reception data register 54 outputs a RX-data full signal to the DMAC 44. The reception data register 54 receives the reception data from the reception shift register 55, and then sets (asserts) the RX-data full signal to a state indicating that the reception data is present. Thus, it is notified to the DMAC 44 that it is possible to read the reception data from the reception data register 54. When the stored reception data is read, the reception data register 54 sets (de-asserts) the RX-data full signal to a state indicating that the reception data is absent.

In the SPI circuit 45, immediately after the microcontroller 14 is activated, the transmission data register 52, the transmission shift register 53, the reception data register 54 and the reception shift register 55 do not store valid data. In this state, the transmission data register 52 asserts the TX-data empty signal, and the reception data register 54 de-asserts the RX-data full signal.

Figure 7A:
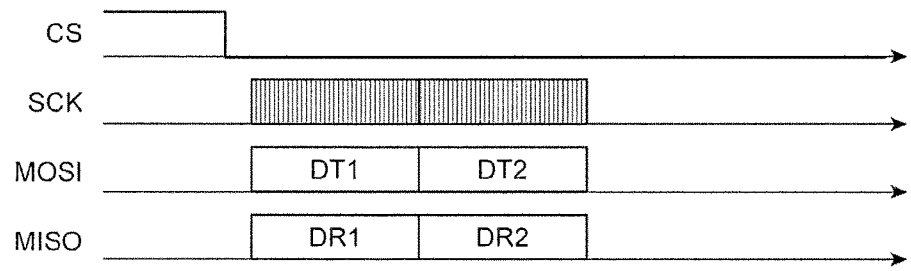
FIG. 7A is a timing chart of signals on a communication bus.
Figure 7B:
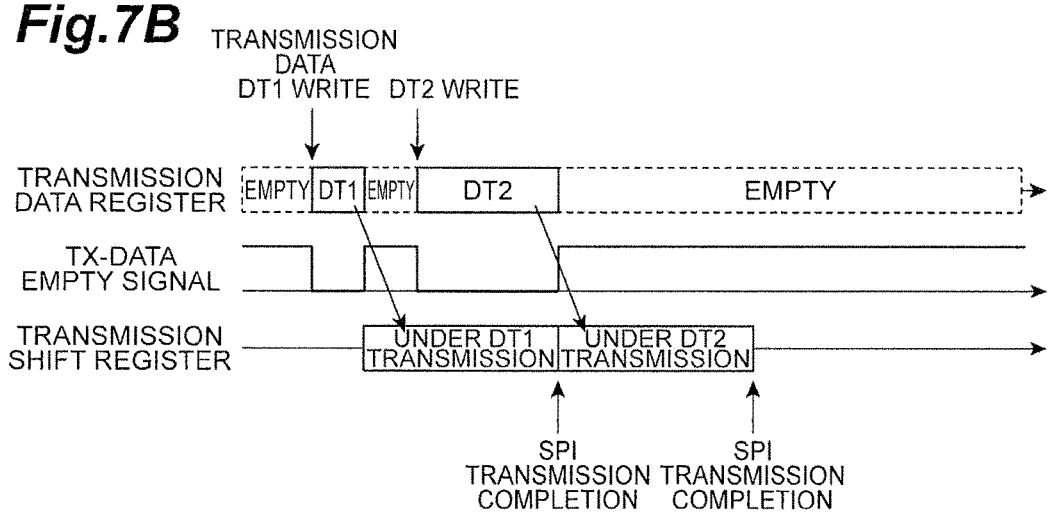
FIG. 7B is a timing chart relating to data transmission of the SPI.
Figure 7C:
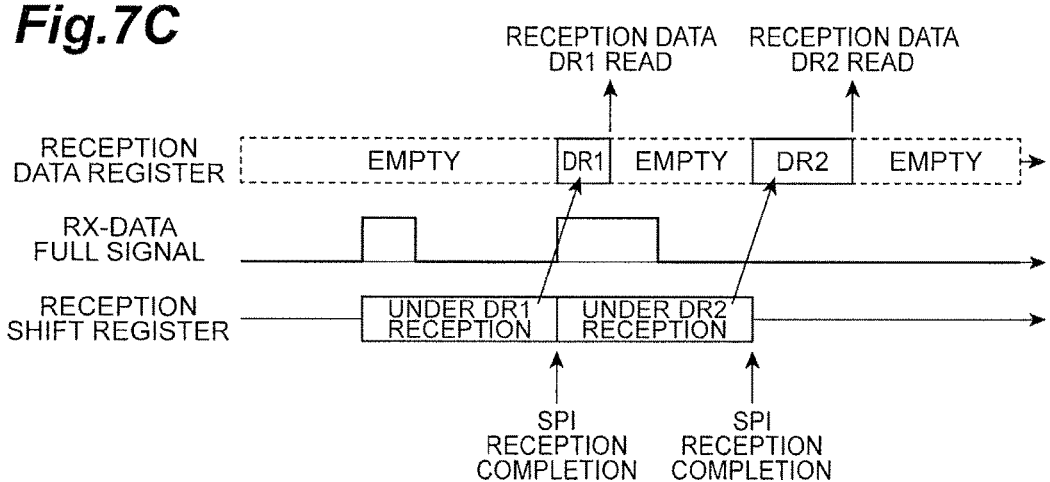
FIG. 7C is a timing chart relating to data reception of the SPI.
Figure 8:
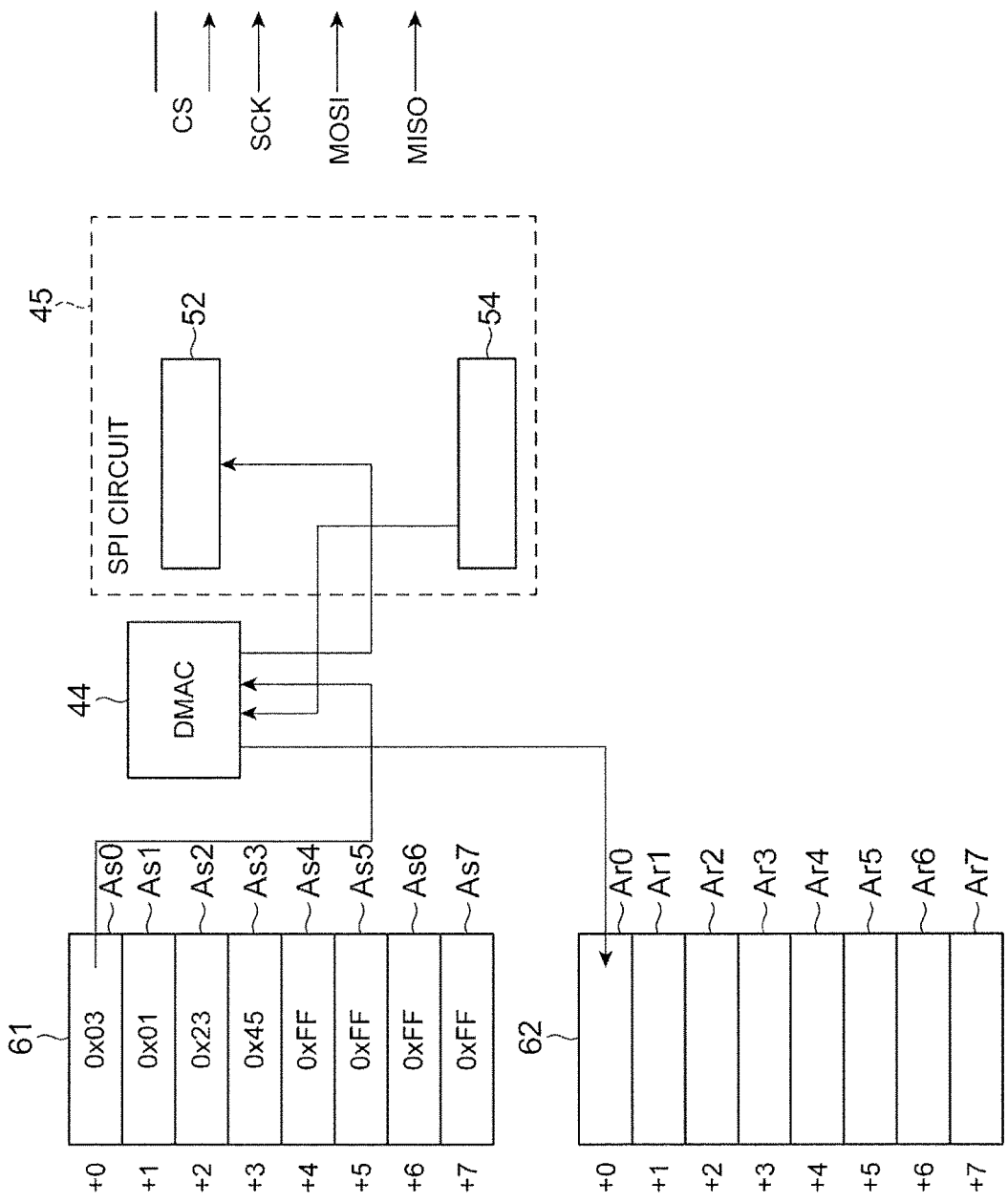
FIG. 8 is a diagram for describing transmission and reception of data by a DMAC (Direct Memory Access Controller)

Subsequently, with reference to FIG. 4 and FIG. 6 to FIG. 8, an operation of reading the data from the memory 16 by the DMA transfer by the microcontroller 14 will be described. FIG. 7A is a timing chart of signals on the communication bus SB1, FIG. 7B is a timing chart relating to data transmission, and FIG. 7C is a timing chart relating to data reception. FIG. 8 is a diagram for describing transmission and reception of data by the DMAC. Examples of the data read from the memory 16 include the configuration data and the firmware. The data is divided into a predetermined block size and read in order from the memory 16 as the data block.

In the reading operation, inside the microcontroller 14, one DMAC 44 transfers the transmission data from a transmission DMA buffer 61 of the RAM 42 to the transmission data register 52, and also transfers the reception data from the reception data register 54 to a reception DMA buffer 62 of the RAM 42. To the transmission DMA buffer 61, addresses As0, As1, . . . indicating the storage location of the data are allocated. To the reception DMA buffer 62, addresses Ar0, Ar1, . . . indicating the storage location of the data are allocated.

In order to perform the DMA transfer, the CPU core 41 stores a command "0x03" (transmission data DT1) in the address As0 of the transmission DMA buffer 61, and addresses "0x01", "0x23" and "0x45" (transmission data DT2 to DT4) of the memory 16 in the following addresses As1 to As3. Note that, in the address As4 and the succeeding addresses of the transmission DMA buffer 61, "0xFF" which is invalid data is stored. Then, the CPU core 41 prepares the DMA descriptor 30. The CPU core 41 sets the setting item 31 in order to transfer the transmission data from the transmission DMA buffer 61 of the RAM 42 to the transmission data register 52, and sets the setting item 32 in order to transfer the reception data from the reception data register 54 to the reception DMA buffer 62 of the RAM 42.

Specifically, the CPU core 41 sets the address As0 of the transmission DMA buffer 61 for the source address 311, sets a value indicating "increment" for the source address increment 312, sets the address of the transmission data register 52 for the destination address 313, sets a value indicating "no increment" for the destination address increment 314, and sets the data length of the data to be transmitted and received for the data length 315. The CPU core 41 sets the address of the reception data register 54 for the source address 321, sets a value indicating "no increment" for the source address increment 322, sets the address Ar0 of the reception DMA buffer 62 for the destination address 323, sets a value indicating "increment" for the destination address increment 324, and sets the data length of the data to be transmitted and received for the data length 325.

After performing the above-described setting, the CPU core 41 sets a value indicating "valid" for the DMA valid 316 and the DMA valid 326. When the DMA transfer becomes valid, since the TX-data empty signal is asserted, the DMAC 44 reads transmission data DT1 of 1 byte from the address As0 of the transmission DMA buffer 61 on the RANI 42 specified by the source address 311. Since the source address increment 312 is set at the value indicating "increment", the source address is incremented by 1 byte and becomes the address As1.

Then, the DMAC 44 writes the read transmission data DT1 to the transmission data register 52 specified by the destination address 313. Since the destination address increment 314 is set at the value indicating "no increment", the destination address is not incremented, and the transmission data register 52 is specified as a transfer destination also in the next DMA transfer. Then, when the transmission data DT1 is written to the transmission data register 52, the TX-data empty signal is de-asserted, and thereafter, the transmission data DT1 written to the transmission data register 52 is transferred to the transmission shift register 53.

Thus, since the valid data becomes absent in the transmission data register 52 (the transmission data register 52 becomes empty), the transmission data register 52 asserts the TX-data empty signal again. Thus, it is notified to the DMAC 44 that it is possible to write the next transmission data to the transmission data register 52.

In addition, by the transfer of the transmission data DT1 to the transmission shift register 53, the control circuit 51 asserts the CS signal and starts output of the SCK signal. In synchronism with the SCK signal, the transmission data DT1 is outputted bit by bit from the transmission shift register 53 as the MOSI signal, and transmitted to the memory 16. In parallel with the transmission of the transmission data DT1 to the memory 16 through the communication bus SB1, to the reception shift register 55, reception data DR1 is read from the memory 16 through the communication bus SB1. Specifically, the MISO signal of the communication bus SB1 is fetched to the reception shift register 55 as the reception data DR1.

At the time, when the next transmission data DT2 is written to the transmission data register 52 by the DMAC 44, the transmission data register 52 de-asserts the TX-data empty signal. However, since the transmission shift register 53 is in the middle of outputting the previous transmission data DT1, the transmission data DT2 written to the transmission data register 52 is not transferred to the transmission shift register 53.

Then, when the transmission data DT1 of 1 byte is transmitted to the memory 16, the reception data DR1 of 1 byte is fetched to the reception shift register 55. Therefore, the reception data DR1 fetched to the reception shift register 55 is transferred to the reception data register 54, and the reception data register 54 asserts the RX-data full signal. At the time, since the valid data is absent in the transmission shift register 53, the transmission data DT2 written to the transmission data register 52 is transferred to the transmission shift register 53. By the transfer of the transmission data to the transmission shift register 53, the control circuit 51 further outputs the SCK signal. In synchronism with the SCK signal, the transmission data DT2 is outputted bit by bit from the transmission shift register 53 as the MOSI signal of the SPI bus, and the MISO signal of the SPI bus is fetched to the reception shift register 55 as the next reception data DR2 in parallel.

When the RX-data full signal is asserted, the DMAC 44 reads the reception data DR1 of 1 byte from the reception data register 54 specified by the source address 321. Since the source address increment 322 is set at a value indicating "no increment", the source address is not incremented, and the reception data register 54 is specified as a transfer source also in the next DMA transfer. Then, the DMAC 44 writes the read reception data DR1 to the address Ar0 of the reception DMA buffer 62 on the RAM 42 specified by the destination address 323. Since the destination address increment 324 is set at a value indicating "increment", the destination address is incremented by one byte, and becomes the address Ar1.

In this way, the transmission data is transmitted byte by byte from the transmission DMA buffer 61 on the RAM 42 to the memory 16, and the DMA transfer is repeated for the transfer data length specified by the data length 315. Similarly, the reception data is read byte by byte from the memory 16, and transmitted to the reception DMA buffer 62 on the RAM 42, and the DMA transfer is repeated for the data length specified by the data length 325.

Then, when the transmission data of the data length specified by the data length 315 has been transmitted and the reception data of the data length specified by the data length 325 has been received, the control circuit 51 stops the output of the SCK signal, and de-asserts the CS signal. Thus, the microcontroller 14 finishes reading the data from the memory 16 using the DMA transfer. In this way, the data is read from the memory 16 without interposing the CPU core 41.

Note that the data (transmission data) read from the transmission DMA buffer 61 is written to the transmission data register 52 through the internal bus B. The transmission data is transmitted from the transmission shift register 53 to the memory 16 through the communication bus SB1. Here, for example, when it is assumed that a maximum data transmission speed of the communication bus SB1 is 20 Mbps and a maximum data transmission speed of the internal bus B is 320 Mbps (assuming that 16-bit parallel data transmission is to be performed at a clock frequency 20 MHz), the write of the data read from the transmission DMA buffer 61 to the transmission data register 52 is faster than the transmission of the transmission data from the transmission shift register 53 to the memory 16. Therefore, the transfer of the next transmission data from the transmission data register 52 to the transmission shift register 53 is made to stand by until the transmission of the transmission data from the transmission shift register 53 to the memory 16 before that ends.

Therefore, while the transmission data is transmitted from the transmission shift register 53 to the memory 16, the DMAC 44 may perform the processing of reading the transmission data from the transmission DMA buffer 61 and writing the read transmission data to the transmission data register 52 and the processing of reading the reception data from the reception data register 54 and writing the read reception data to the reception DMA buffer 62 in order. Since the data transfer through the internal bus B is performed at a higher speed than the data transfer through the communication bus SB1, it is sometimes described that the processing of reading the transmission data from the transmission DMA buffer 61 and writing the read transmission data to the transmission data register 52 and the processing of reading the reception data from the reception data register 54 and writing the read reception data to the reception DMA buffer 62 are performed in parallel.

While the data is simultaneously transmitted and received in the SPI communication, the transmission data is read from the transmission DMA buffer 61 before being transmitted from the SPI circuit 45. On the other hand, the reception data is received by the SPI circuit 45 and then stored in the reception DMA buffer 62. Therefore, it is possible to turn the transmission DMA buffer 61 and the reception DMA buffer 62 to one shared DMA buffer. Next, with reference to FIG. 9 to FIG. 13, the operation of reading the data from the memory 16 by the DMA transfer by the microcontroller 14 using the shared DMA buffer is described. Note that it is described paying attention to flow of the data, and the description of the TX-data empty signal and the RX-data full signal or the like is omitted. It is assumed that the memory 16 transmits "0xAB", "0xCD", "0xAB" and "0xCD" as dummy data from the first to fourth bytes. To a shared DMA buffer 60, addresses A0, A1, . . . indicating the storage location of the data are allocated.

In order to perform the DMA transfer, the CPU core 41 stores the command "0x03" in the address A0 of the shared DMA buffer 60, and "0x01", "0x23" and "0x45" indicating the addresses of the memory 16 in the following addresses A1 to A3. Note that, in the address A4 and the succeeding addresses of the shared DMA buffer 60, "0xFF" which is the invalid data is stored. Then, the CPU core 41 prepares the DMA descriptor 30.

Specifically, the CPU core 41 sets the address A0 of the shared DMA buffer 60 for the source address 311, sets the value indicating "increment" for the source address increment 312, sets the address of the transmission data register 52 for the destination address 313, sets the value indicating "no increment" for the destination address increment 314, and sets the data length of the data to be transmitted and received for the data length 315. The CPU core 41 sets the address of the reception data register 54 for the source address 321, sets the value indicating "no increment" for the source address increment 322, sets the address A0 of the shared DMA buffer 60 for the destination address 323, sets the value indicating "increment" for the destination address increment 324, and sets the data length of the data to be transmitted and received for the data length 325.

After performing the above-described setting, the CPU core 41 sets the value indicating "valid" for the DMA valid 316 and the DMA valid 326.

Figure 9:
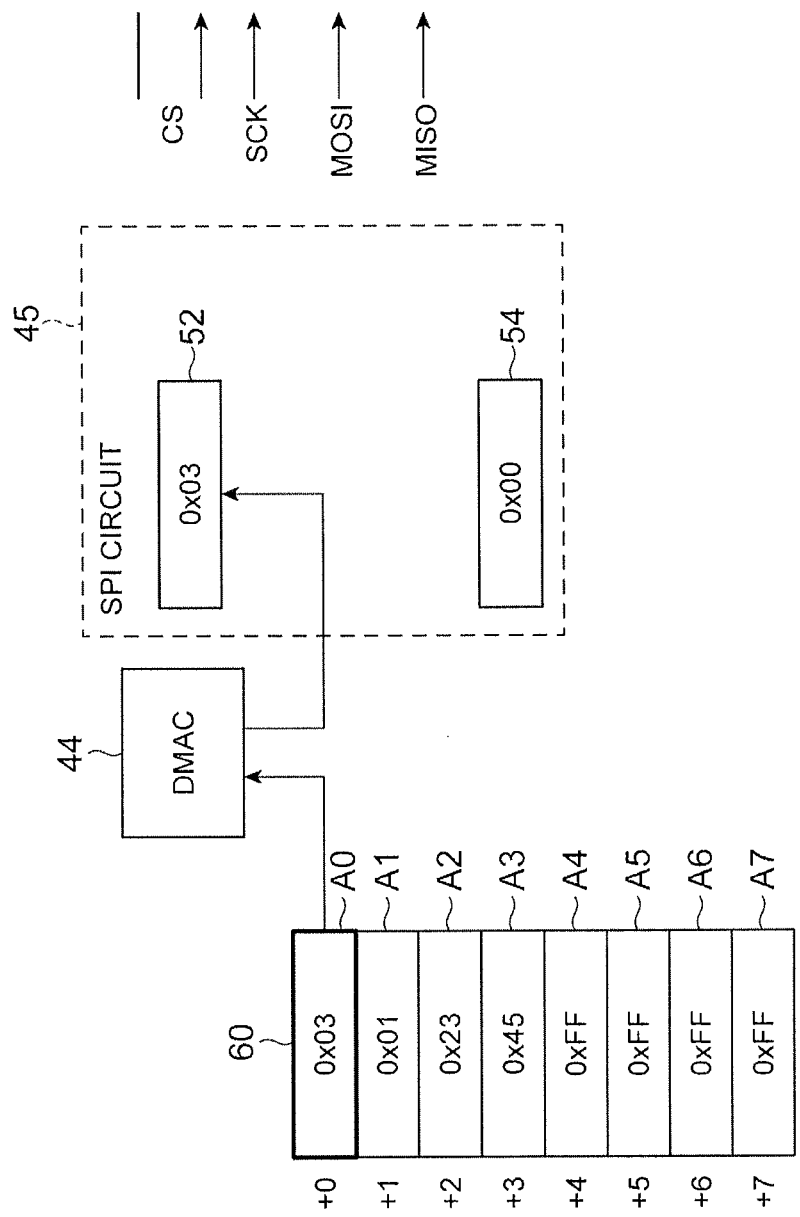
FIG. 9 is a diagram for describing the transmission and reception of the data by the DMAC using a shared DMA buffer.
Figure 10:
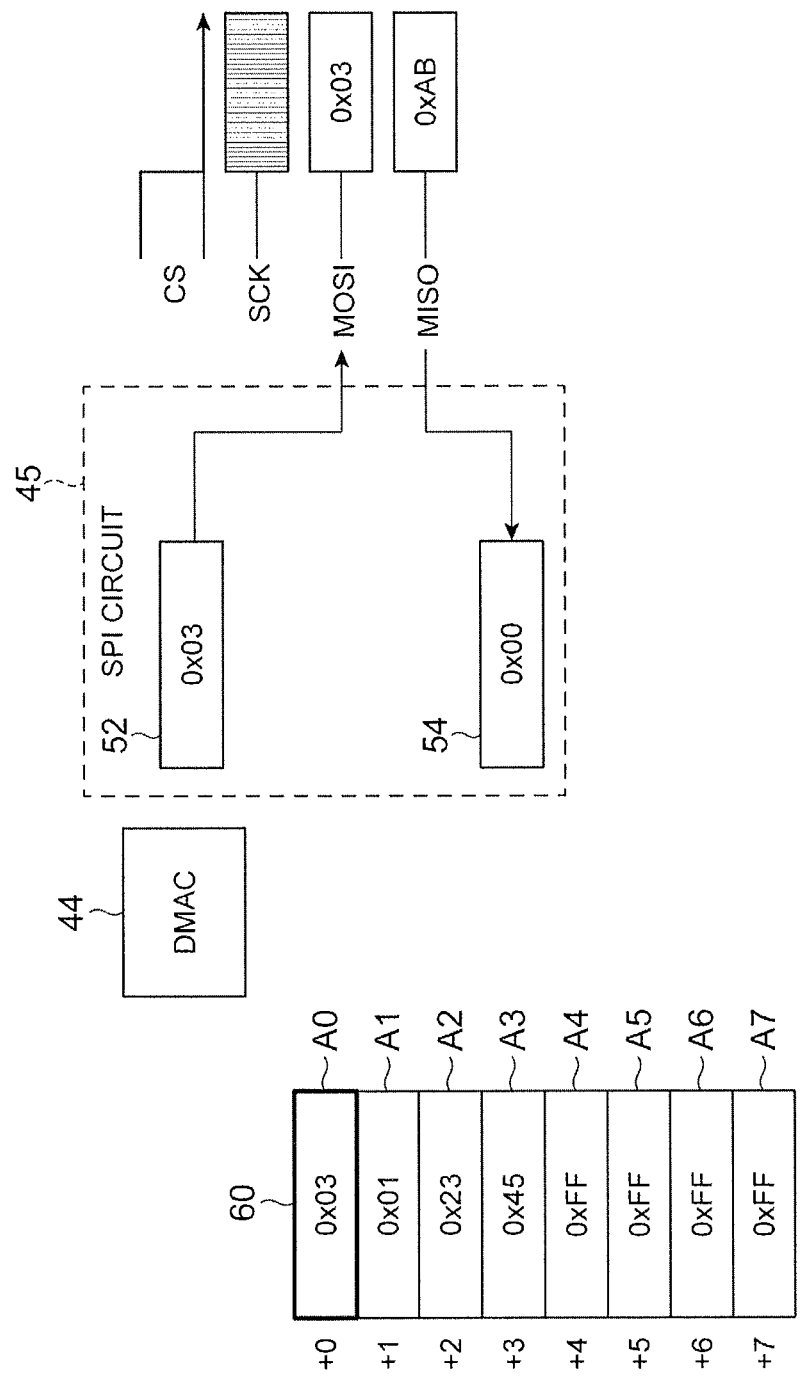
FIG. 10 is a diagram for describing the transmission and reception of the data by the DMAC using the shared DMA buffer.

Then, as illustrated in FIG. 9, the DMAC 44 reads the transmission data "0x03" of 1 byte from the address A0 of the shared DMA buffer 60, and writes the transmission data "0x03" to the transmission data register 52. When the transmission data "0x03" is written to the transmission data register 52, the transmission data register 52 transfers the transmission data "0x03" to the transmission shift register 53. Then, as illustrated in FIG. 10, by the control circuit 51 asserting the CS signal and then outputting the SCK signal, the transmission data "0x03" is outputted as the MOSI signal from the transmission shift register 53, and reception data "0xAB" is fetched from the MISO signal to the reception shift register 55.

Figure 11:
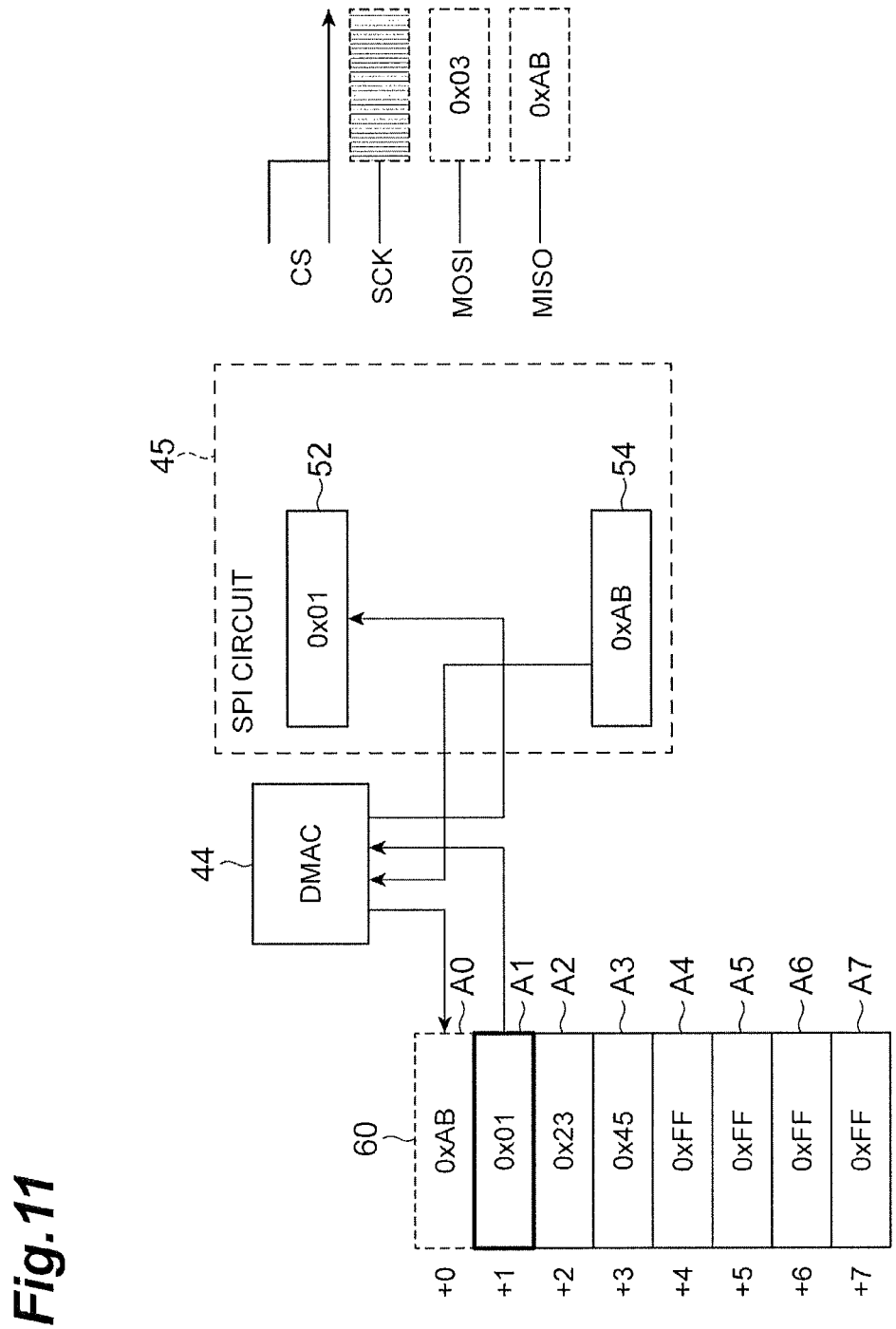
FIG. 11 is a diagram for describing the transmission and reception of the data by the DMAC using the shared DMA buffer.

Then, as illustrated in FIG. 11, at the instant at which the communication of 1 byte is completed, the reception data "0xAB" fetched to the reception shift register 55 is transferred to the reception data register 54. Then, the DMAC 44 reads the reception data "0xAB" from the reception data register 54, writes the reception data "0xAB" to the address A0 of the shared DMA buffer 60, then reads the next transmission data "0x01" from the address A1 of the shared DMA buffer 60, and writes the transmission data "0x01" to the transmission data register 52. At the time, since the already-transmitted transmission data has been stored in the address A0 of the shared DMA buffer 60, even when the reception data is written, non-transmitted data is not overwritten.

Figure 12:
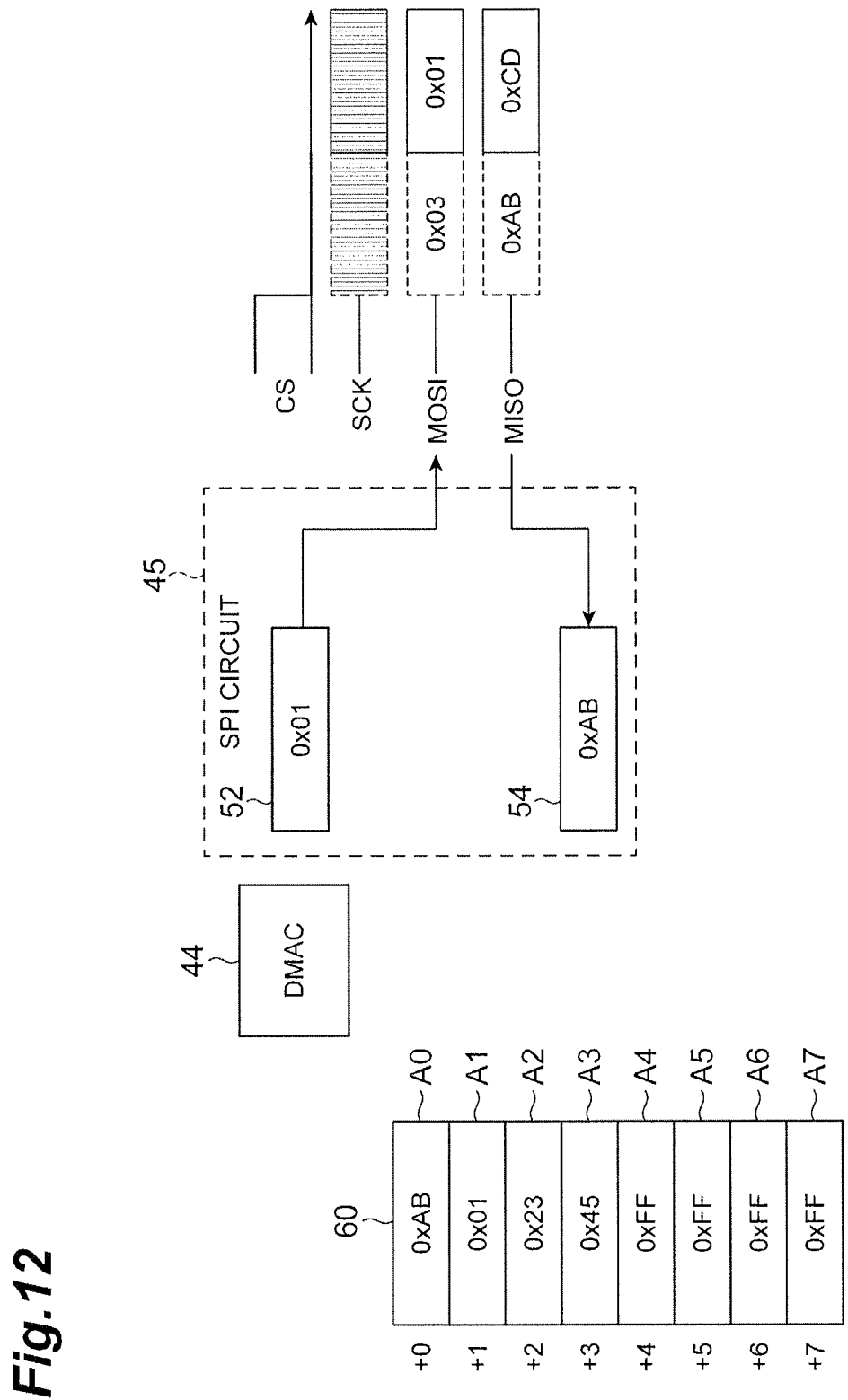
FIG. 12 is a diagram for describing the transmission and reception of the data by the DMAC using the shared DMA buffer.

When the transmission data "0x01" is written to the transmission data register 52, the transmission data register 52 transfers the transmission data "0x01" to the transmission shift register 53. Then, as illustrated in FIG. 12, by the control circuit 51 outputting the SCK signal further in the state of asserting the CS signal, the transmission data "0x01" is outputted as the MOSI signal from the transmission shift register 53, and reception data "0xCD" is fetched from the MISO signal to the reception shift register 55.

Figure 13:
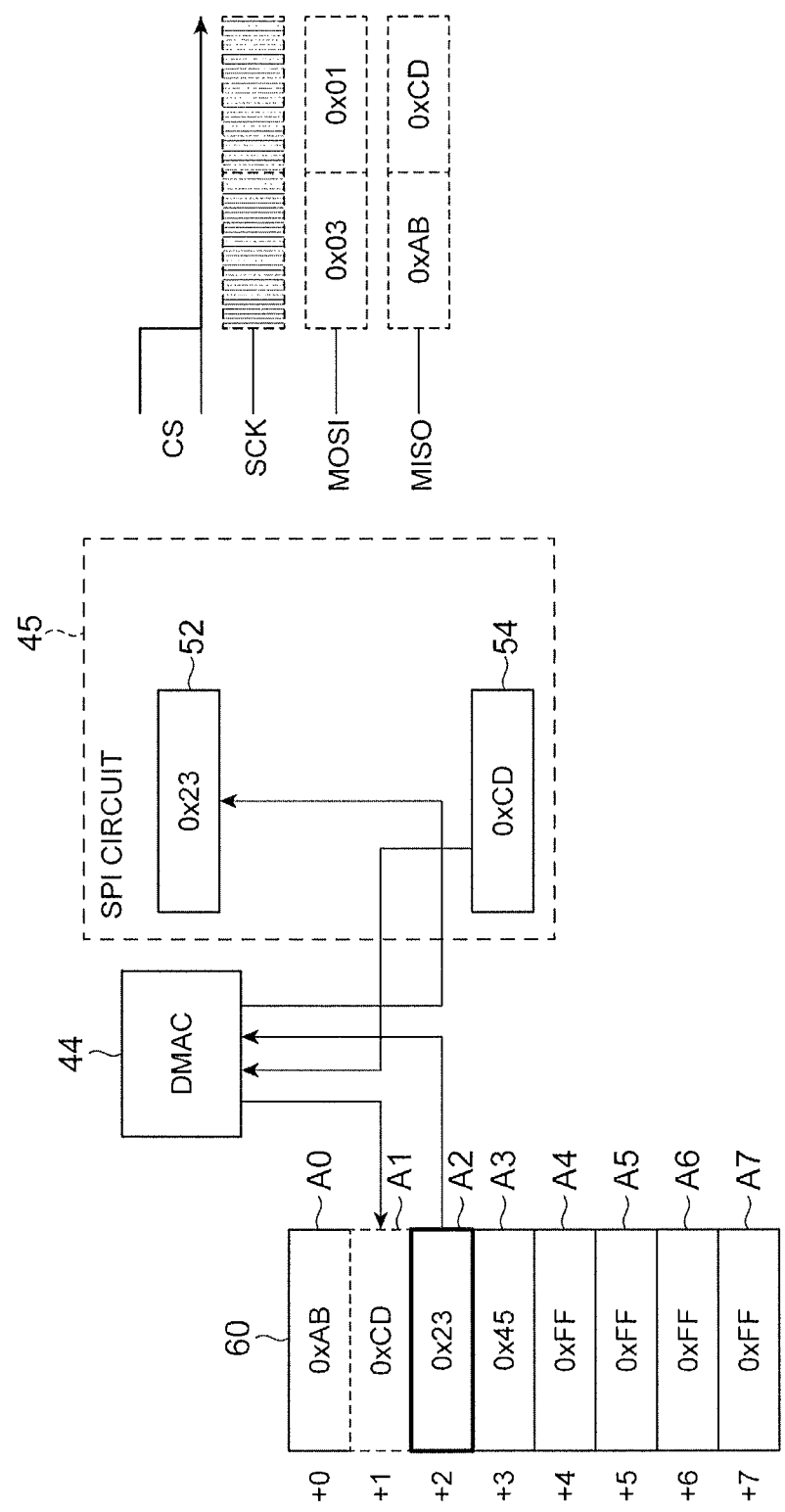
FIG. 13 is a diagram for describing the transmission and reception of the data by the DMAC using the shared DMA buffer.

Then, as illustrated in FIG. 13, at the instant at which the communication of 1 byte is completed, the reception data "0xCD" fetched to the reception shift register 55 is transferred to the reception data register 54. Then, the DMAC 44 reads the reception data "0xCD" from the reception data register 54, writes the reception data "0xCD" to the address A1 of the shared DMA buffer 60, then reads the next transmission data "0x23" from the address A2 of the shared DMA buffer 60, and writes the transmission data "0x23" to the transmission data register 52.

As described above, even when the same storage region of the RAM 42 is shared as the transmission DMA buffer and the reception DMA buffer, the reception data is written to the address storing the transmission data already transmitted to the transmission data register 52. Therefore, all the transmission data is correctly transmitted and the reception data is also correctly stored.

In the optical transceiver 1, when the optical transceiver 1 is activated, the configuration data stored in the memory 16 is read through the communication bus SB1 by the microcontroller 14, and transmitted to the FPGA 13 through the communication bus SB2. In addition, when updating the configuration data, by the microcontroller 14, the new configuration data is received from the host device through the MDIO interface and written to the memory 16 through the communication bus SB1. In this way, since the microcontroller 14 not only rewrites the configuration data stored in the memory 16 to the new configuration data but also reads the configuration data stored in the memory 16 and transmits it to the FPGA 13, the FPGA 13 does not need to be electrically connected to the memory 16. Therefore, since there is no need of providing a switching circuit or the like, the configuration data of the FPGA 13 can be updated while restraining increase in the number of components.

In the flash ROM 43 storing the firmware of the microcontroller 14, rewrite time is relatively long, and the data cannot be read from the flash ROM 43 during rewrite processing thereof. Therefore, in the case that the upgrade data received through the MDIO interface is stored into the flash ROM 43, the microcontroller 14 stops executing the firmware during the rewrite processing of the flash ROM 43, and an MDIO response to the host device cannot be made. On the other hand, the optical transceiver 1 stores the upgrade data not in the flash ROM 43 of the microcontroller 14 but in the memory 16. Thus, without stopping the operation of the optical transceiver 1, the upgrade data can be stored into the memory 16. That is, the upgrade data can be received and stored while providing a sufficiently fast response in compliant with the specification of the MDIO interface.

The upgrade data includes not only the new configuration data but also the new firmware for updating a part of the firmware. Therefore, similarly to the configuration data, the firmware is updated through (1) receiving the new firmware from the host device, (2) storing the received new firmware into the memory 16, (3) reading the new firmware stored in the memory 16, and (4) storing it in the flash ROM 43. By such updating of the firmware, the processing relating to the updating of the configuration data described above can be performed in the state that the optical transceiver 1 is kept plugged into the host device. Thus, for example, even when the specifications relating to the communication between the host device and the optical transceiver 1 are changed, by updating the pertinent part of the firmware, the updating of the configuration data can be continuously performed without detaching the optical transceiver 1 from the host device.

In addition, since the transmission of the transmission data to the memory 16 and the read of the configuration data from the memory 16 are concurrently performed by the DMAC 44, the time needed for the transmission and reception of the data between the microcontroller 14 and the memory 16 may be shortened.

In the case of using the shared DMA buffer 60, the storage location inside the RAM 42 may be used in common for the transmission data and for the reception data. Therefore, in comparison with the case of providing different storage locations separately for the transmission data and for the reception data, a buffer capacity for the DMA transfer may be halved, and the capacity of the RAM 42 may be reduced.

(Modification of the Optical Transmitter According to the First Embodiment of the Present Invention)

Figure 14:
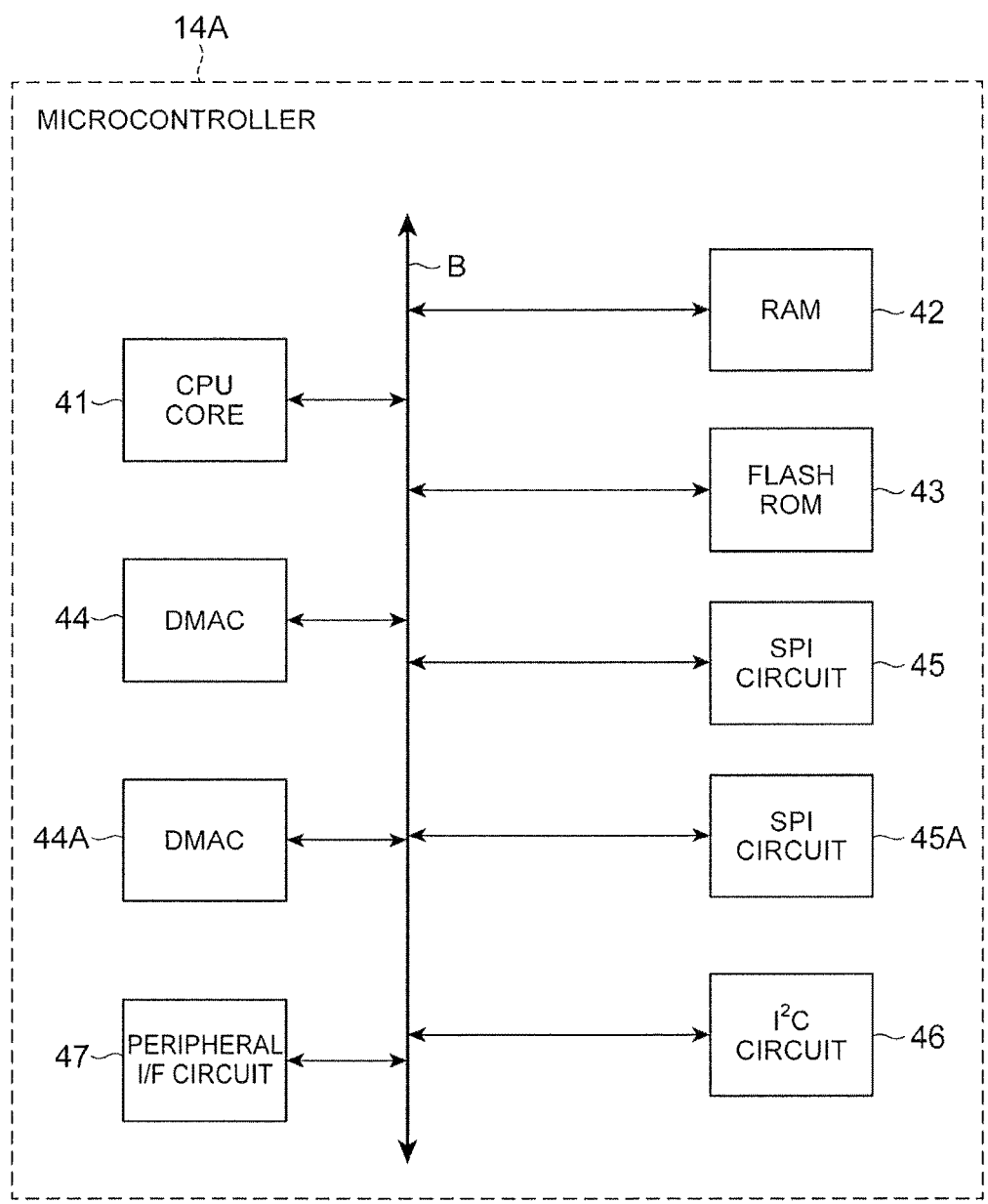
FIG. 14 is a diagram illustrating a configuration of a variation of the microcontroller in FIG. 1.

FIG. 14 is a diagram illustrating a configuration of a microcontroller 14A of a modification of the optical transmitter 1 according to the first embodiment. As illustrated in FIG. 14, in comparison with the microcontroller 14 in FIG. 3, the microcontroller 14A is different in that it further includes a DMAC 44A (second DMA controller) and an SPI circuit 45A.

The DMAC 44A is a controller which directly performs the transmission and reception (DMA transfer) of the data between the RAM 42 and the SPI circuit 45A without interposing the CPU core 41. Concurrently with writing the configuration data stored in the memory 16 to the RAM 42, the DMAC 44A also transmits the configuration data written in the RAM 42 to the FPGA 13 through the communication bus SB2. Specifically, after the DMAC 44 writes each data block of the configuration data to a predetermined area of the RAM 42, the DMAC 44A reads the data block from the area, and transmits the read data block to the FPGA 13 through the communication bus SB2. That is, in the RAM 42, a common region is allocated to the reception DMA buffer for storing the reception data received from the memory 16 in common with the transmission DMA buffer for transmitting the stored data in the memory 16 to the FPGA 13.

The SPI circuit 45A is electrically connected to the FPGA 13 through the communication bus SB2, and transmits the data to the FPGA 13 by synchronous serial transfer using a clock signal and a data signal. That is, although the SPI circuit 45A is configured to handle four signals of the CS signal, the SCK signal, the MOSI signal and the MISO signal for communication and needs four signal lines thereof, namely, thi CS signal line, the SCK signal line, the MOSI signal line, and the MISO signal line, only the SCK signal line and the MOSI signal line may be connected to the FPGA 13.

The DMAC 44 reads the configuration data stored in the memory 16 through the SPI circuit 45, and stores the read configuration data in the shared DMA buffer 60. The DMAC 44A reads the configuration data stored in the shared DMA buffer 60, and transmits the read configuration data to the FPGA 13 through the SPI circuit 45A.

Figure 15:
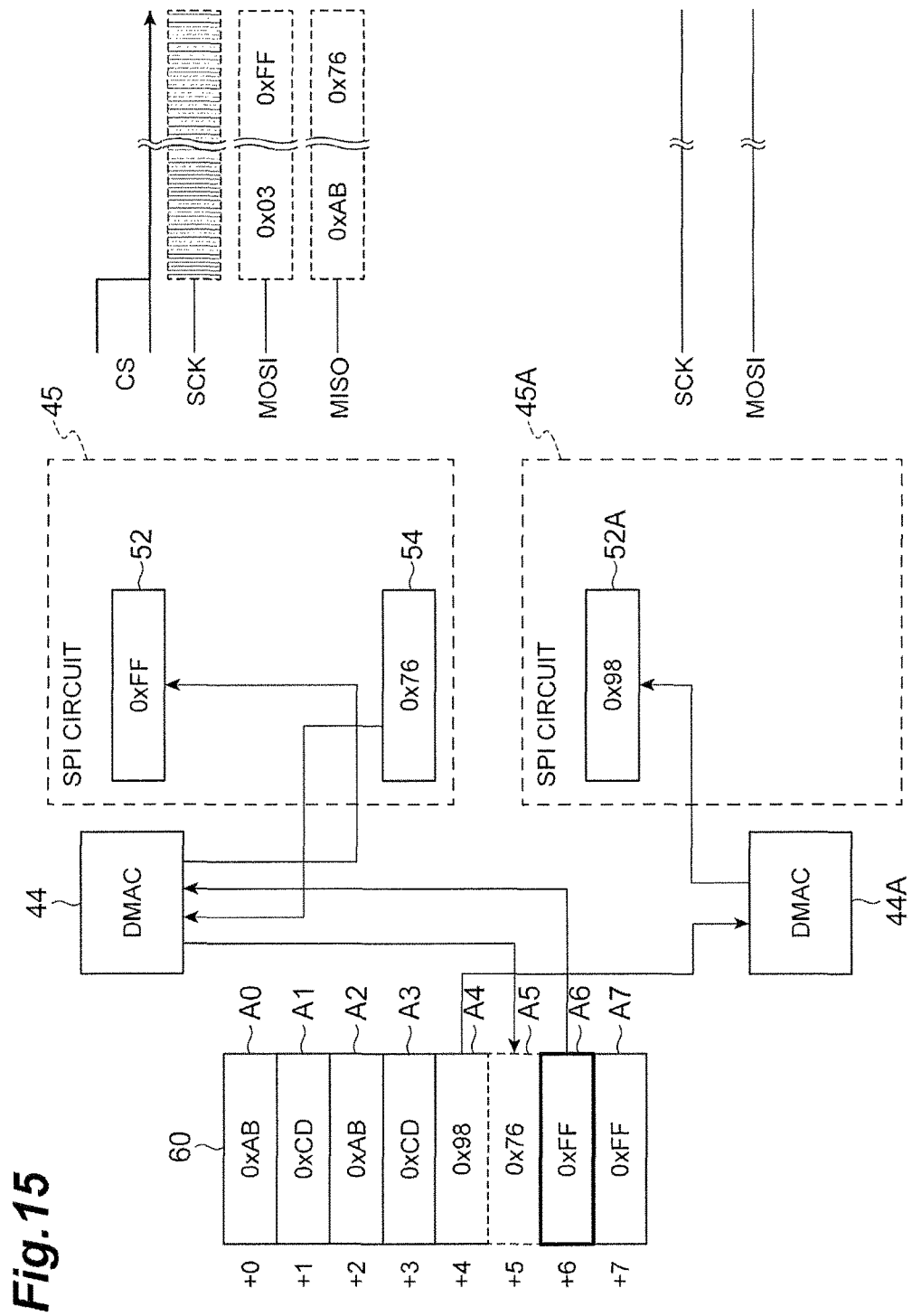
FIG. 15 is a diagram for describing the transmission and reception of the data by two DMACs using the shared DMA buffer.
Figure 16:
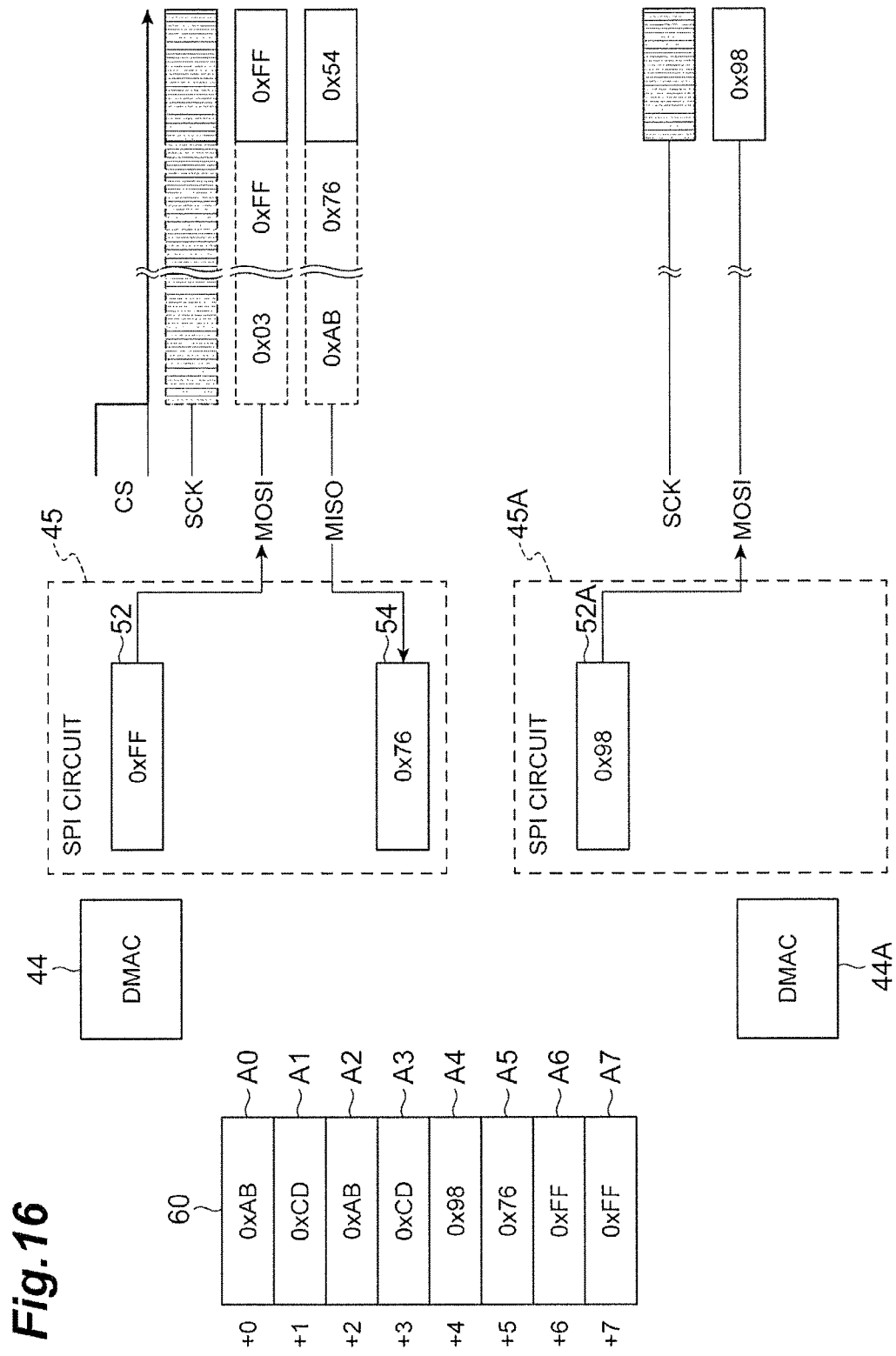
FIG. 16 is a diagram for describing the transmission and reception of the data by the two DMACs using the shared DMA buffer.

Subsequently, with reference to FIG. 15 and FIG. 16, an operation of reading the configuration data from the memory 16 and transmitting the read configuration data to the FPGA 13 using DMA transfer by the microcontroller 14A will be described. In this example, the shared DMA buffer 60, which may be allocated in the RAM 42, is used. Note that it is assumed that the memory 16 transmits "0xAB", "0xCD", "0xAB" and "0xCD" as the dummy data from the first to the fourth bytes. In addition, it is assumed that the memory 16 transmits "0x98", "0x76", "0x54", . . . as the data block of the configuration data.

In order to perform the DMA transfer, the CPU core 41 stores the command "0x03" in the address A0 of the shared DMA buffer 60, and "0x01", "0x23" and "0x45" indicating the addresses of the memory 16 in the following addresses A1 to A3. Note that, in the address A4 and the succeeding addresses of the shared DMA buffer 60, "0xFF" which is the invalid data is stored. Then, the CPU core 41 prepares the DMA descriptor 30 for the DMAC 44 and the DMA descriptor 30 for the DMAC 44A.

Specifically, as the setting item 31 for the DMAC 44, the CPU core 41 sets the address A0 of the shared DMA buffer 60 for the source address 311, sets the value indicating "increment" for the source address increment 312, sets the address of the transmission data register 52 for the destination address 313, sets the value indicating "no increment" for the destination address increment 314, and sets the data length of the data to be transmitted and received for the data length 315. As the setting item 32 for the DMAC 44, the CPU core 41 sets the address of the reception data register 54 for the source address 321, sets the value indicating "no increment" for the source address increment 322, sets the address A0 of the shared DMA buffer 60 for the destination address 323, sets the value indicating "increment" for the destination address increment 324, and sets the data length of the data to be transmitted and received for the data length 325.

Further, as the setting item 31 for the DMAC 44A, the CPU core 41 sets the address A4 of the shared DMA buffer 60 for the source address 311, sets the value indicating "increment" for the source address increment 312, sets the address of a transmission data register 52A for the destination address 313, sets the value indicating "no increment" for the destination address increment 314, and sets the data length of the data to be transmitted and received for the data length 315. Since the data is not received from the FPGA 13, the CPU core 41 may not set the setting item 32 for the DMAC 44A.

After performing the above-described setting, the CPU core 41 sets the value indicating "valid" for the DMA valid 316 of the setting item 31 for the DMAC 44 and the DMA valid 326 of the setting item 32 for the DMAC 44.

Then, by the DMAC 44, similarly to FIG. 9 to FIG. 13, the data is transmitted and received for 5 bytes between the microcontroller 14A and the memory 16. Then, as illustrated in FIG. 15, at the instant at which the communication of the data of the fifth byte is completed through the communication bus SB1, reception data "0x76" fetched to the reception shift register 55 is transferred to the reception data register 54. Then, the DMAC 44 reads the reception data "0x76" from the reception data register 54, writes the reception data "0x76" to the address A5 of the shared DMA buffer 60, subsequently reads the next transmission data "0xFF" from the address A6 of the shared DMA buffer 60, and writes the transmission data "0xFF" to the transmission data register 52.

At the time, the CPU core 41 sets the value indicating "valid" for the DMA valid 316 of the setting item 31 for the DMAC 44A and the DMA valid 326 of the setting item 32 for the DMAC 44A. Thus, the DMAC 44A reads reception data "0x98" from the address A4 of the shared DMA buffer 60, and writes the reception data "0x98" to the transmission data register 52A of the SPI circuit 45A.

When the transmission data "0xFF" is written to the transmission data register 52, the transmission data register 52 transfers the transmission data "0xFF" to the transmission shift register 53. In addition, when the reception data "0x98" is written to the transmission data register 52A, the transmission data register 52A transfers the reception data "0x98" to the transmission shift register 53A. Then, as illustrated in FIG. 16, the control circuit 51 outputs the SCK signal further in the state of asserting the CS signal. Thus, the transmission data "0xFF" is outputted as the MOSI signal from the transmission shift register 53, and reception data "0x54" is fetched from the MISO signal to the reception shift register 55. At the time, the control circuit 51A outputs the SCK signal. Thus, the reception data "0x98" is outputted as the MOSI signal from the transmission shift register 53A.

In this way, after the reception data of 1 byte or more is read from the memory 16 and the read reception data is stored in the shared DMA buffer 60 by the DMAC 44, separately, the reception data stored in the shared DMA buffer 60 is read and the read reception data is transmitted to the FPGA 13 by the DMAC 44A.

Figure 17:
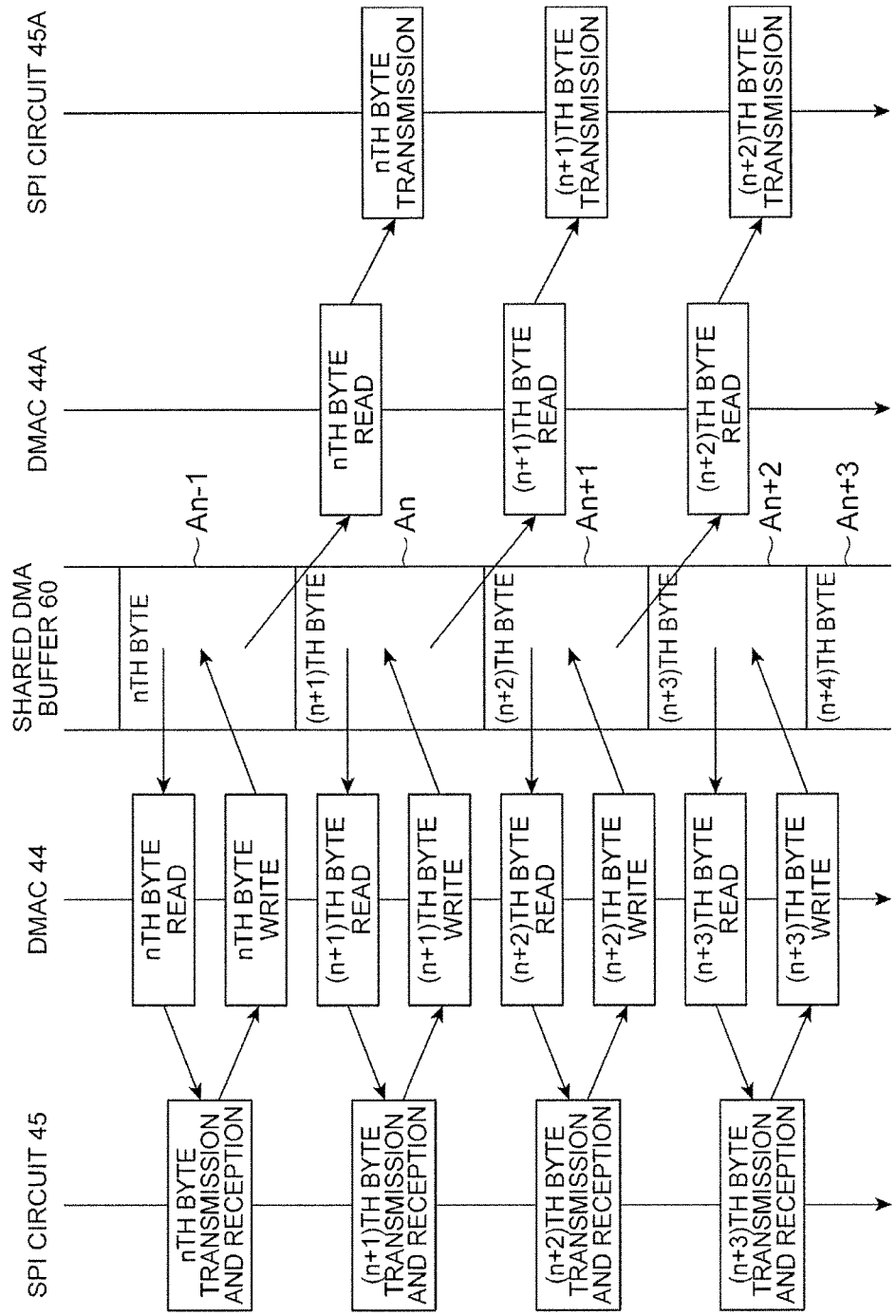
FIG. 17 is a sequence diagram for describing the transmission and reception of the data in the microcontroller in FIG. 14.

That is, as illustrated in FIG. 17, first, the DMAC 44 reads the transmission data of the n-th byte stored in the address An−1 of the shared DMA buffer 60 and transmits the transmission data of the n-th byte to the memory 16 through the SPI circuit 45, and the SPI circuit 45 acquires the reception data of the n-th byte from the memory 16. Then, the DMAC 44 stores the reception data of the n-th byte in the address An−1 of the shared DMA buffer 60. Subsequently, the DMAC 44A reads the reception data of the n-th byte stored in the address An−1, and transmits the reception data of the n-th byte to the FPGA 13 through the SPI circuit 45A. At the time, the DMAC 44 reads the transmission data of the (n+1)th byte stored in the address An of the shared DMA buffer 60 and transmits it to the memory 16 through the SPI circuit 45, and the SPI circuit 45 acquires the reception of the (n+1)th byte from the memory 16.

In this way, the DMAC 44 and the DMAC 44A do not simultaneously access the same address of the shared DMA buffer 60. In addition, even when the accessing address is different, since the DMAC 44 and the DMAC 44A cannot simultaneously use the internal bus B, actually one of the DMAC 44 and the DMAC 44A accesses the shared DMA buffer 60 first and the other accesses it thereafter. However, since a data transmission speed of the internal bus B is substantially higher than the data transmission speed of the communication bus SB1 and the communication bus SB2, the operation of the DMAC 44 and the operation of the DMAC 44A are performed almost concurrently.

In addition, the CPU core 41 validates the DMA transfer of the DMAC 44, and then validates the DMA transfer of the DMAC 44A after the lapse of predetermined time. Thus, the CPU core 41 controls start timing of the operation of the DMAC 44 and start timing of the operation of the DMAC 44A. For example, the CPU core 41 may validate the DMA transfer of the DMAC 44A by writing invalid data to a predetermined address of the shared DMA buffer 60 beforehand, and confirming that the invalid data is rewritten to valid data after validating the DMA transfer of the DMAC 44.

Next, in the configuration of FIG. 14, processing speed in the case of performing the configuration using the DMA transfer is compared with processing speed in the case that the CPU core 41 performs the configuration by software. For example, XC6SLX16 manufactured by Xilinx, Inc. is used as the FPGA 13, and ADuCM320 manufactured by Analog Devices, Inc. is used as the microcontroller 14A. At the time, the data size of the configuration data is about 473.6 kBytes. Note that the clock frequency of the SCK signal of the SPI circuit 45 and the SPI circuit 45A is defined as 20 MHz. The clock frequency of the internal bus B is defined as 20 MHz at maximum. That is, the maximum data transmission speed of the communication bus SB1 and the communication bus SB2 is 20 Mbps, and the maximum data transmission speed of the internal bus B (16-bit parallel transmission) is 320 Mbps.

In the case that the CPU core 41 performs the configuration by the software, the CPU core 41 confirms that the valid data is not stored in the transmission data register 52 and then writes the data to the transmission data register 52. In addition, the CPU core 41 confirms that the valid data is stored in the reception data register 54 and then reads the data from the reception data register 54. That is, in the case of reading the data of 1 byte from the memory 16 through the SPI circuit 45, the CPU core 41 needs to perform at least (a) the processing of confirming that the valid data is not stored in the transmission data register 52, (b) the processing of writing the data to the transmission data register 52, (c) the processing of transmitting and receiving the data to/from the memory 16 by the SPI circuit 45, (d) the processing of confirming that the valid data is stored in the reception data register 54, and (e) the processing of reading the data from the reception data register 54. Similarly, in the case of writing the data of 1 byte to the FPGA 13 through the SPI circuit 45A, the CPU core 41 needs to perform at least (1) the processing of confirming that the valid data is not stored in the transmission data register 52A, (2) the processing of writing the data to the transmission data register 52A, and (3) the processing of transmitting the data to the FPGA 13 by the SPI circuit 45A.

In the communication bus SB1, when it is assumed that two clock pulses are needed for one access, each access needs at least 0.1 microseconds. In addition, in order for the SPI circuits 45 and 45A to transmit and receive the data of 1 byte, eight clock pulses (=0.4 microseconds) are needed. Therefore, in order to read the data of 1 byte from the memory 16 through the SPI circuit 45 by the software, at least the time of 0.8 microseconds (=0.1+0.1+0.4+0.1+0.1) is needed, and in order to write the data of 1 byte to the FPGA 13 through the SPI circuit 45A, the time of 0.6 microseconds (=0.1+0.4+0.1) is needed. Therefore, in order to read all the configuration data from the memory 16 and write all the configuration data to the FPGA 13, the time of 663 milliseconds (=(0.6+0.8)×473.6 k) is needed. During the time, it is difficult for the CPU core 41 to perform the processing other than the transfer of the configuration data.

On the other hand, in the case of performing the configuration using the DMA transfer, it is confirmed that the valid data is not stored in the transmission data register 52 and it is confirmed that the valid data is stored in the reception data register 54 by hardware. Therefore, the access of the internal bus B by the CPU core 41 is not needed. In addition, read processing from the memory 16 and write processing to the FPGA 13 can be executed concurrently. Note that, when it is assumed that the DMACs 44 and 44A perform the transfer of 2048 bytes at maximum each time, the CPU core 41 needs to set the DMA descriptor 30 for each DMA transfer. The setting of the DMA descriptor 30 needs the time of about 10 microseconds.

Therefore, the DMA transfer of one time requires the time of 829.2 microseconds which is the total of the setting time of the DMA descriptor 30 and the data transfer time of 2048 bytes. In order to read all the configuration data from the memory 16 and write all the configuration data to the FPGA 13, the DMA transfer is repeated 237 times for 473.6 kBytes so that the time of 196.5 milliseconds is needed. In addition, during the DMA transfer, the CPU core 41 may perform the processing other than the transfer of the configuration data.

In this way, in comparison with the case that the CPU core 41 performs the configuration by the software, processing time can be shortened and the CPU core 41 may further perform the other processing during the processing in the case of performing the configuration using the DMA transfer. Note that, since the internal bus B of the microcontroller 14A is operated at 20 MHz at maximum and can transfer the data of 16 bits by two clock pulses, the transmission speed of the internal bus B becomes 20 megabytes/second. In addition, since the SCK signal of the SPI circuits 45 and 45A can be operated at 20 MHz at maximum, the transmission speed of the communication bus SB1 and the communication bus SB2 becomes 1.25 megabytes/second at maximum.

Therefore, there is sufficient time for the DMAC 44 to transmit and receive the data with the SPI circuit 45 and for the DMAC 44A to transmit the data to the SPI circuit 45A while the data is transmitted and received by the communication bus SB1 and the communication bus SB2.

As described above, also in the microcontroller 14A of the modification, effects similar to that of the microcontroller 14 are demonstrated. In addition, in the microcontroller 14A of the modification, in parallel with the processing of writing the configuration data stored in the memory 16 to the RAM 42 by the DMAC 44, the DMAC 44A transmits the configuration data written in the RAM 42 to the FPGA 13 through the communication bus SB2. Therefore, the time needed for reading the configuration data from the memory 16 and transmitting the read configuration data to the FPGA 13 may be shortened. In addition, since the shared DMA buffer 60 of the RAM 42 is used in common by the DMAC 44 and the DMAC 44A, there is no need of providing the storage location of the data to be transmitted to the FPGA 13 further. Thus, the capacity of the RAM 42 may be reduced.

Note that the optical transceiver and the microcontroller relating to the present invention are not limited to the above-described embodiment. For example, instead of the DMAC 44, the microcontrollers 14 and 14A may include a DMAC which performs the processing of reading the transmission data from the transmission DMA buffer 61 and writing the read transmission data to the transmission data register 52 and a DMAC which performs the processing of reading the reception data from the reception data register 54 and writing the read reception data to the reception DMA buffer 62.

In addition, the shared DMA buffer 60 may be used as a ring buffer.

What is claimed is:

1. An optical transceiver comprising:
   a Management Data Input/Output (MDIO) interface for communicating with an external device;
   a logic device including configuration data and an internal circuit reconfigurable according to the configuration data;
   a first memory configured to store the configuration data;
   a first communication bus electrically connected to the first memory;
   a second communication bus electrically connected to the logic device; and
   a microcontroller configured to receive new configuration data from the external device through the MDIO interface and to write the new configuration data to the first memory through the first communication bus for rewriting of the configuration data in a case of receiving an update command from the external device, and configured to read the new configuration data stored in the first memory through the first communication bus and send the new configuration data to the logic device through the second communication bus in a case that the optical transceiver is activated,
   wherein the microcontroller includes a second memory and a first direct memory access (DMA) controller,
   wherein the first DMA controller reads the new configuration data stored in the first memory through the first communication bus and writes the new configuration data to the second memory in the case that the optical transceiver is activated, and
   wherein the microcontroller sends the new configuration data written in the second memory through the second communication bus to the logic device in the case that the optical transceiver is activated.

2. The optical transceiver according to claim 1,
   wherein the second memory stores instruction data for reading the new configuration data stored in the first memory, and
   wherein the first DMA controller sends the instruction data to the first memory and reads a data block of the new configuration data stored in the first memory through the first communication bus, the data block having a block size, and writes the data block of the new configuration data to the second memory through the first communication bus.

3. The optical transceiver according to claim 2,
   wherein the first DMA controller utilizes a transmission DMA buffer for sending the instruction data and a reception DMA buffer for reading the data block of the new configuration data stored in the first memory, and
   wherein the transmission DMA buffer and the reception DMA buffer are set to a same storage region allocated in the second memory.

4. The optical transceiver according to claim 2,
   wherein the instruction data includes address information indicating a storage location storing the new configuration data in the first memory.

5. The optical transceiver according to claim 1,
   wherein the microcontroller further includes a second DMA controller configured to operate concurrently with the first DMA controller,
   wherein the first DMA controller writes the new configuration data stored in the first memory to the second memory through the first communication bus, and
   wherein the second DMA controller transmits the new configuration data written in the second memory by the first DMA controller to the logic device through the second communication bus.

6. The optical transceiver according to claim 5,
   wherein the second memory stores instruction data for reading the configuration data stored in the first memory,
   wherein the first DMA controller performs processing of (1) reading the instruction data stored in the second memory, (2) transmitting the read instruction data to the first memory, (3) reading a data block of the new configuration data stored in the first memory, the data block having a block size, and (4) writing the read data block to the second memory through the first communication bus, and
   wherein the second DMA controller transmits the data block written in the second memory by the first DMA controller through the second communication bus to the logic device.

7. The optical transceiver according to claim 6,
   wherein the second memory includes a storage region,
   wherein the first DMA controller transmits the instruction data stored in the storage region to the first memory and stores the data block stored in the first memory to the storage region, and
   wherein, the second DMA controller reads the data block from the storage location and transmits the read data block to the logic device.

8. The optical transceiver according to claim 6,
   wherein the instruction data includes address information indicating a storage location storing the new configuration data in the first memory.

9. The optical transceiver according to claim 1,
   wherein the microcontroller further includes a third memory,
   wherein the third memory stores firmware, and wherein the microcontroller performs, by executing the firmware, processing of reading the configuration data stored in the first memory, processing of transmitting the read configuration data to the logic device, processing of receiving the new configuration data from the external device, and processing of writing the new configuration data to the first memory.

10. An upgrading method of an optical transceiver for communicating with an external device through a MDIO interface, the optical transceiver including a logic device including configuration data and an internal circuit reconfigurable based on the configuration data, a first memory for storing the configuration data, a first communication bus to which the first memory is electrically connected, a second communication bus to which the logic device is electrically connected, and a microcontroller including a second memory and a direct memory access (DMA) controller, the upgrading method comprising:

reading the configuration data stored in the first memory through the first communication bus by the DMA, controller, when the optical transceiver is activated;

by the DMA controller, writing the read configuration data read by the DMA controller to the second memory;

transmitting the read configuration data written in the second memory through the second communication bus to the logic device;

receiving new configuration data from the external device through the MDIO interface;

writing the received new configuration data to the first memory through the first communication bus; and rewriting the configuration data to the new configuration data.

* * * * *